US012597699B2

(12) United States Patent
Yun et al.

(10) Patent No.: US 12,597,699 B2
(45) Date of Patent: Apr. 7, 2026

(54) ELECTRONIC DEVICE INCLUDING ANTENNA

(71) Applicant: Samsung Electronics Co., Ltd., Suwon-si (KR)

(72) Inventors: Sumin Yun, Suwon-si (KR); Hosaeng Kim, Suwon-si (KR); Seongjin Park, Suwon-si (KR); Hyunjeong Lee, Suwon-si (KR); Hyungjoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 18/819,286

(22) Filed: Aug. 29, 2024

(65) Prior Publication Data

US 2025/0030151 A1 Jan. 23, 2025

Related U.S. Application Data

(63) Continuation of application No. PCT/KR2024/010166, filed on Jul. 16, 2024.

(30) Foreign Application Priority Data

Jul. 18, 2023 (KR) ........................ 10-2023-0092952
Jul. 19, 2023 (KR) ........................ 10-2023-0093909

(51) Int. Cl.
| | |
|---|---|
| *H01Q 1/24* | (2006.01) |
| *H01Q 1/38* | (2006.01) |
| *H01Q 9/04* | (2006.01) |
| *H04M 1/02* | (2006.01) |

(52) U.S. Cl.
CPC .............. *H01Q 1/243* (2013.01); *H01Q 1/38* (2013.01); *H01Q 9/0492* (2013.01); *H04M 1/0216* (2013.01)

(58) Field of Classification Search
CPC .......... H01Q 1/24; H01Q 1/243; H01Q 1/523; H01Q 5/25; H01Q 5/42; H01Q 9/0428;
(Continued)

(56) References Cited

U.S. PATENT DOCUMENTS

| | | |
|---|---|---|
| 10,770,801 B2 | 9/2020 | Park et al. |
| 2014/0266917 A1 | 9/2014 | De Luis et al. |
| | (Continued) | |

FOREIGN PATENT DOCUMENTS

| | | | | |
|---|---|---|---|---|
| CN | 101728639 A | 6/2010 | | |
| CN | 112350056 A | * 2/2021 | .............. | H01Q 1/46 |
| | (Continued) | | | |

OTHER PUBLICATIONS

International Search Report dated Oct. 25, 2024, issued in International Application No. PCT/KR2024/010166.

*Primary Examiner* — Hoang V Nguyen
(74) *Attorney, Agent, or Firm* — Jefferson IP Law, LLP

(57) ABSTRACT

An electronic device is provided. The electronic device includes a housing, an antenna structure disposed in the housing, wherein the antenna structure includes a substrate including a first substrate surface, a second substrate surface facing away from the first substrate surface, and a ground layer disposed between the first substrate surface and the second substrate surface, a first conductive patch including a plurality of sub-patches arranged to correspond to the ground layer, and a second conductive patch disposed between a first sub-patch and a second sub-patch among the plurality of sub-patches of the first conductive patch when viewed from above the first substrate surface, and a wireless communication circuit configured to transmit or receive a first wireless signal in a first frequency band through the plurality of sub-patches of the first conductive patch and to transmit or receive a second wireless signal in a second frequency band through the second conductive patch. The (Continued)

electronic device further includes a first non-conductive area disposed in a position overlapping at least a portion of the second conductive patch when viewed from above the first substrate surface.

20 Claims, 30 Drawing Sheets

(58) Field of Classification Search
CPC .... H01Q 9/045; H01Q 9/0464; H01Q 9/0492; H01Q 21/0075; H01Q 21/065; H01Q 21/08
See application file for complete search history.

(56) References Cited

U.S. PATENT DOCUMENTS

| | | |
|---|---|---|
| 2021/0320417 A1 | 10/2021 | Lee et al. |
| 2022/0173525 A1 | 6/2022 | Jia |
| 2023/0026240 A1 | 1/2023 | Jung et al. |
| 2023/0079082 A1* | 3/2023 | Lim ...................... H01Q 21/08 343/702 |
| 2023/0178901 A1 | 6/2023 | Kim et al. |
| 2023/0223695 A1 | 7/2023 | Yun et al. |

FOREIGN PATENT DOCUMENTS

| | | |
|---|---|---|
| CN | 112751168 B | 11/2022 |
| EP | 4329092 A1 | 2/2024 |
| JP | 7090330 B2 | 6/2022 |
| KR | 10-1328234 B1 | 11/2013 |
| KR | 10-2021-0125345 A | 10/2021 |
| KR | 10-2022-0015693 A | 2/2022 |
| KR | 10-2022-0017131 A | 2/2022 |
| KR | 10-2022-0163658 A | 12/2022 |
| WO | 2023/136632 A1 | 7/2023 |

* cited by examiner

FIG. 6A

AOA MEASUREMENT RESULTS OF PROPOSED STRUCTURE (VS ROTATION OF COUNTERPART TERMINAL)

ELECTRONIC DEVICE INCLUDING ANTENNA

CROSS-REFERENCE TO RELATED APPLICATION(S)

This application is a continuation application, claiming priority under § 365(c), of an International application No. PCT/KR2024/010166, filed on Jul. 16, 2024, which is based on and claims the benefit of a Korean patent application number 10-2023-0092952, filed on Jul. 18, 2023, in the Korean Intellectual Property Office, and of a Korean patent application number 10-2023-0093909, filed on Jul. 19, 2023, in the Korean Intellectual Property Office, the disclosure of each of which is incorporated by reference herein in its entirety.

TECHNICAL FIELD

The disclosure relates to an electronic device including an antenna.

BACKGROUND ART

An electronic device may communicate with external electronic devices by using various wireless communication technologies. For example, the wireless communication technologies may include at least one of ultra-wideband (UWB) communication, wireless fidelity (Wi-Fi) communication, long term evolution (LTE) communication, $5^{th}$ generation (5G) communication (or new radio (NR) communication), or Bluetooth. For example, an electronic device supporting ultra-wideband (UWB) communication may determine the location the location of at least one external electronic device or the distance to at least one external electronic device by using a UWB antenna including at least two antenna elements (e.g., conductive patches or antenna radiators).

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

An electronic device includes at least one antenna (e.g., an antenna structure or an antenna module). The at least one antenna may include a legacy antenna operating in a frequency band of about 600 MHz to 6000 MHz, a 5G antenna operating in a frequency band of about 3 GHz to 300 GHz, or an antenna configured to determine the location of a nearby external electronic device. For example, the antenna configured to determine the location of a nearby external electronic device includes an ultra-wideband (UWB) antenna including at least two antenna elements operating in a frequency band of about 6 GHz to 8.5 GHz.

In an embodiment, the UWB antenna includes a dual-band antenna, which operates in a first frequency band (e.g., Ch 9, a frequency band in the range of about 7.75 GHz to 8.25 GHz) via a first conductive patch and a second conductive patch arranged side by side along a first direction in a dielectric substrate (e.g., a flexible printed circuit board (FPCB)), and operates in a second frequency band (e.g., Ch 5, a frequency band in the range of about 6.25 GHz to 6.75

GHz) different from the first frequency band via a third conductive patch arranged in parallel with the first conductive patch along a second direction different from (e.g., perpendicular to) the first direction.

As the UWB antennas, linear-polarization (LP) antennas, which are easy to design with dual bands, may be mainly used due to the design constraint of circular polarization (CP) antennas, which should be configured to have a symmetrical shape.

However, the linear polarization antennas may have large performance differences depending on the alignment state between transceivers of the electronic device and an external electronic device. For example, when the polarization direction between the transceivers of the electronic device and the external electronic device approaches 90 degrees (e.g., when the radiation surfaces of antennas are distorted), the transmission and reception sensitivity may decrease and provide inconvenience to a user.

Solution to Problem

Aspects of the disclosure are to address at least the above-mentioned problems and/or disadvantages and to provide at least the advantages described below. Accordingly, an aspect of the disclosure is to provide an antenna that is capable of helping improve the radiation performance of a ultra-wideband (UWB) antenna and an electronic device including the same.

Another aspect of the disclosure is to provide an antenna that is capable of helping improve isolation between antennas and an electronic device including the same.

However, the problems to be solved in the disclosure are not limited to the above-mentioned problems, and may be variously expanded without departing from the spirit and scope of the disclosure.

In accordance with an aspect of the disclosure, an electronic device is provided. The electronic device includes a housing, an antenna structure disposed in the inner space of the housing, wherein the antenna structure includes a substrate including a first substrate surface, a second substrate surface facing away from the first substrate surface, and a ground layer disposed between the first substrate surface and the second substrate surface, a first conductive patch including a plurality of sub-patches arranged to correspond to the ground layer, and a second conductive patch disposed between a first sub-patch and a second sub-patch among the plurality of sub-patches of the first conductive patch when viewed from above the first substrate surface, and a wireless communication circuit configured to transmit or receive a first wireless signal in a first frequency band through the plurality of sub-patches of the first conductive patch and to transmit or receive a second wireless signal in a second frequency band through the second conductive patch. The electronic device may further include a first non-conductive area disposed in a position overlapping at least a portion of the second conductive patch when viewed from above the first substrate surface.

Advantageous Effects of Invention

In the electronic device according to various embodiments of the disclosure, since the second conductive patch operating in a second frequency band is disposed between the plurality of first conductive patches used for ultra-wideband (UWB) and operating in a first frequency band, and the non-conductive area is provided in at least a partial area overlapping the second conductive patch, isolation can be improved between the plurality of first conductive patches, and since the second conductive patch operates as a diversity antenna with other surrounding antennas, the radiation performance of antennas can be improved.

Various other effects understood directly or indirectly through the document may be provided.

Advantageous effects obtainable from the disclosure may not be limited to the above-mentioned effects, and other effects which are not mentioned may be clearly understood, through the following descriptions, by those skilled in the art to which the disclosure pertains.

BRIEF DESCRIPTION OF DRAWINGS

With regard to the description of the drawings, the same or like reference signs may be used to designate the same or like elements.

FIGS. 6A and 6B are diagrams comparing radiation performances of second antennas depending on the presence or absence of a non-conductive area according to various embodiments of the disclosure;

FIG. 16A is a front perspective view of an electronic device according to an embodiment of the disclosure;

FIG. 16B is a rear perspective view of the electronic device according to an embodiment of the disclosure;

MODE FOR THE INVENTION

Figure 1:
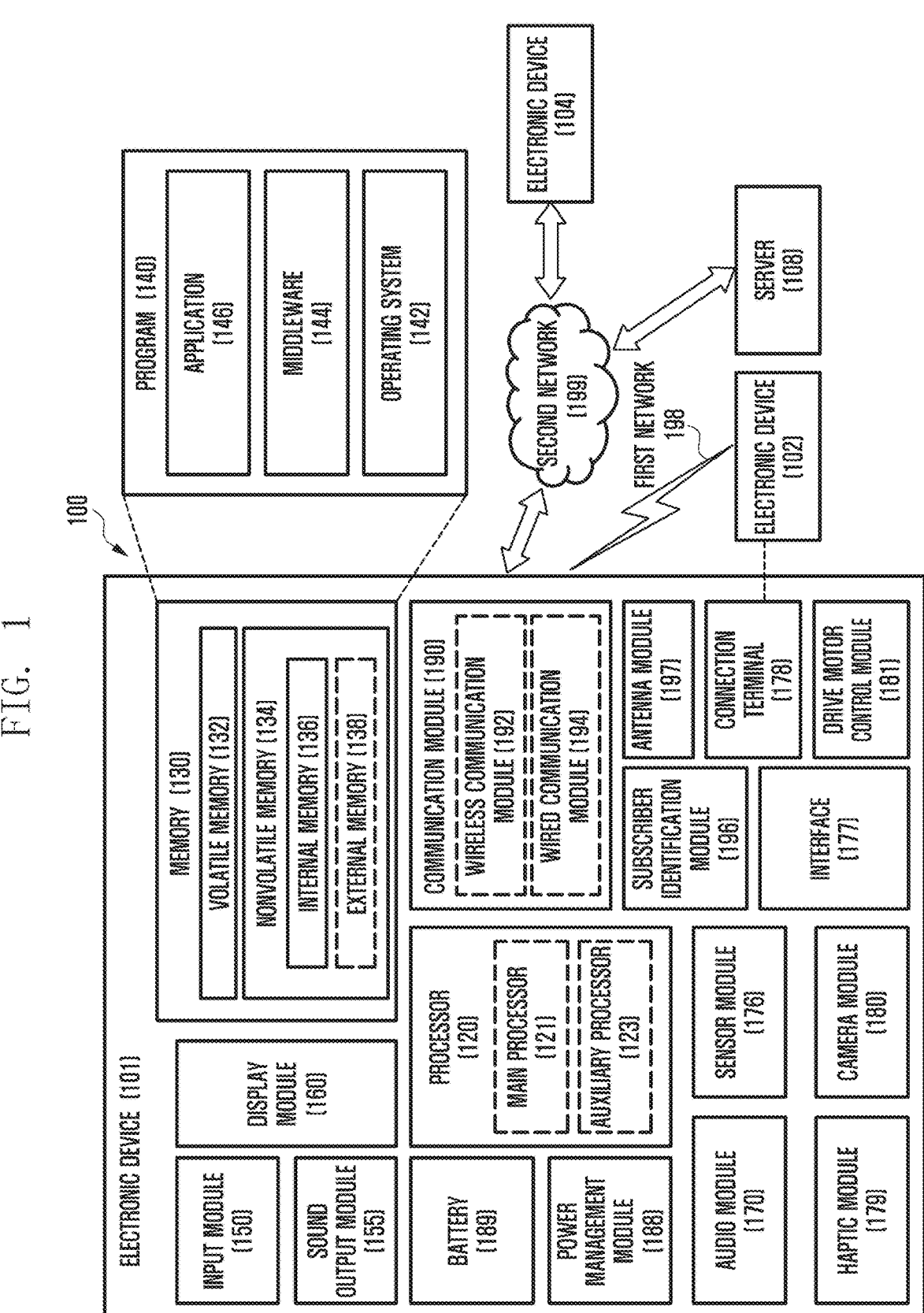
FIG. 1 is a block diagram of an electronic device in a network environment according to an embodiment of the disclosure.

Hereinafter, embodiments of the disclosure will be described in detail with reference to the accompanying drawings so that those ordinarily skilled in the art to which the disclosure pertains can easily practice them. However, the disclosure may be implemented in many different forms without being limited to those embodiments described herein. In relation to the description of the drawings, identical or similar reference symbols may be used for the same or similar components. Additionally, in the drawings and related descriptions, descriptions of well-known functions and configurations may be omitted for clarity and brevity.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS)

chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include at least one of a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, an antenna module 197, or a drive control module 181. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, For example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, For example, software (e.g., the program 140) and input data or output data for a command related thereto. The memory 130 may include the volatile memory 132 or the non-volatile memory 134. The non-volatile memory 134 may include at least one of internal memory 136 or external memory 138.

The program 140 may be stored in the memory 130 as software, and may include, For example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, For example, a microphone, a mouse, a keyboard, a key (e.g., a button), or a digital pen (e.g., a stylus pen).

The sound output module 155 may output sound signals to the outside of the electronic device 101. The sound output module 155 may include, For example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, For example, a display, a hologram device, or a projector and control circuitry to control a corresponding one of the display, hologram device, and projector. According to an embodiment, the display module 160 may include a touch sensor adapted to detect a touch, or a pressure sensor adapted to measure the strength of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, For example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, For example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, For example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, For example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, For example, a power management integrated circuit (PMIC).

The battery 189 may supply power to at least one component of the electronic device 101. According to an embodiment, the battery 189 may include, For example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, For example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a lateral) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI).

According to an embodiment, commands or data may be transmitted or received between the electronic device 101 and the external electronic device 104 via the server 108 coupled with the second network 199. Each of the electronic device 102 or 104 may be a device of a same type as, or a different type, from the electronic device 101. According to an embodiment, all or some of operations to be executed at the electronic device 101 may be executed at one or more of the external electronic device 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The electronic device 101 may provide the outcome, with or without further processing of the outcome, as at least part of a reply to the request. To that end, a cloud computing, distributed computing, mobile edge computing (MEC), or client-server computing technology may be used, For example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) on the basis of 5G communication technology or IoT-related technology.

Figure 2A:
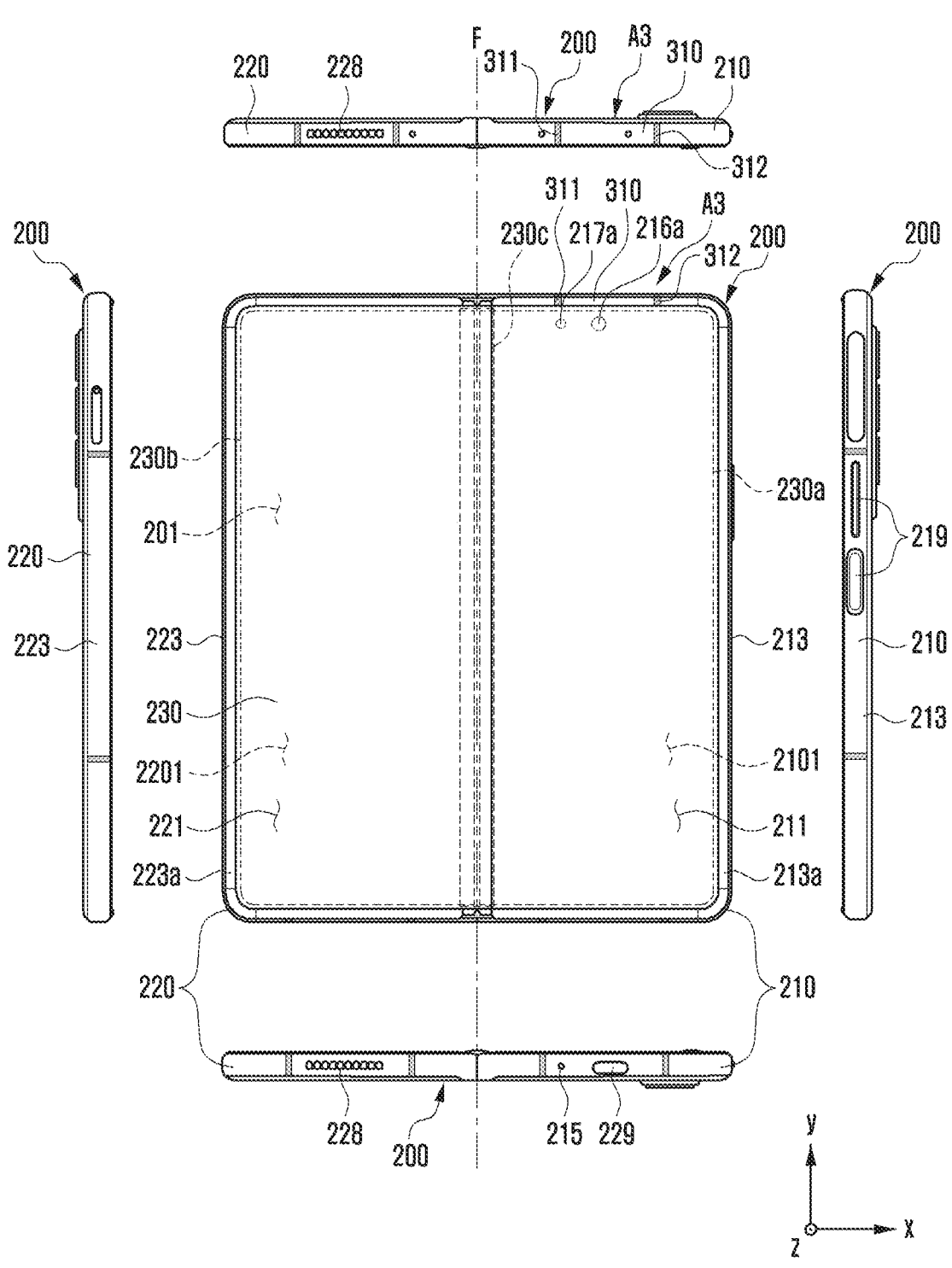
FIG. 2A is a view illustrating the front surface of an electronic device in an unfolded state according to an embodiment of the disclosure.
Figure 2B:
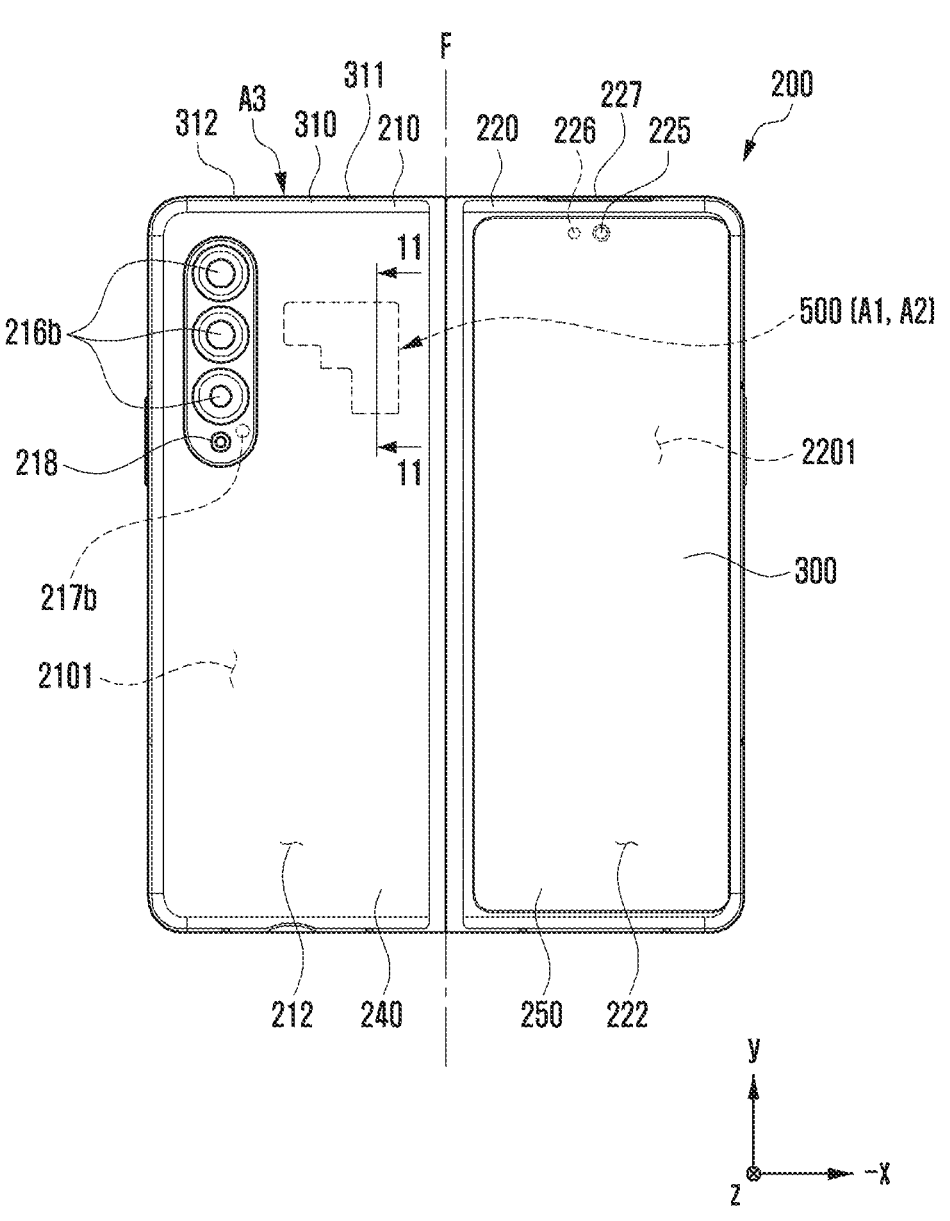
FIG. 2B is a view illustrating the rear surface of the electronic device in the unfolded state according to an embodiment of the disclosure.

FIG. 2A is a view illustrating the front surface of an electronic device in an unfolded state according to an embodiment of the disclosure. FIG. 2B is a plan view illustrating the rear surface of the electronic device in the unfolded state according to an embodiment of the disclosure.

Figure 3A:
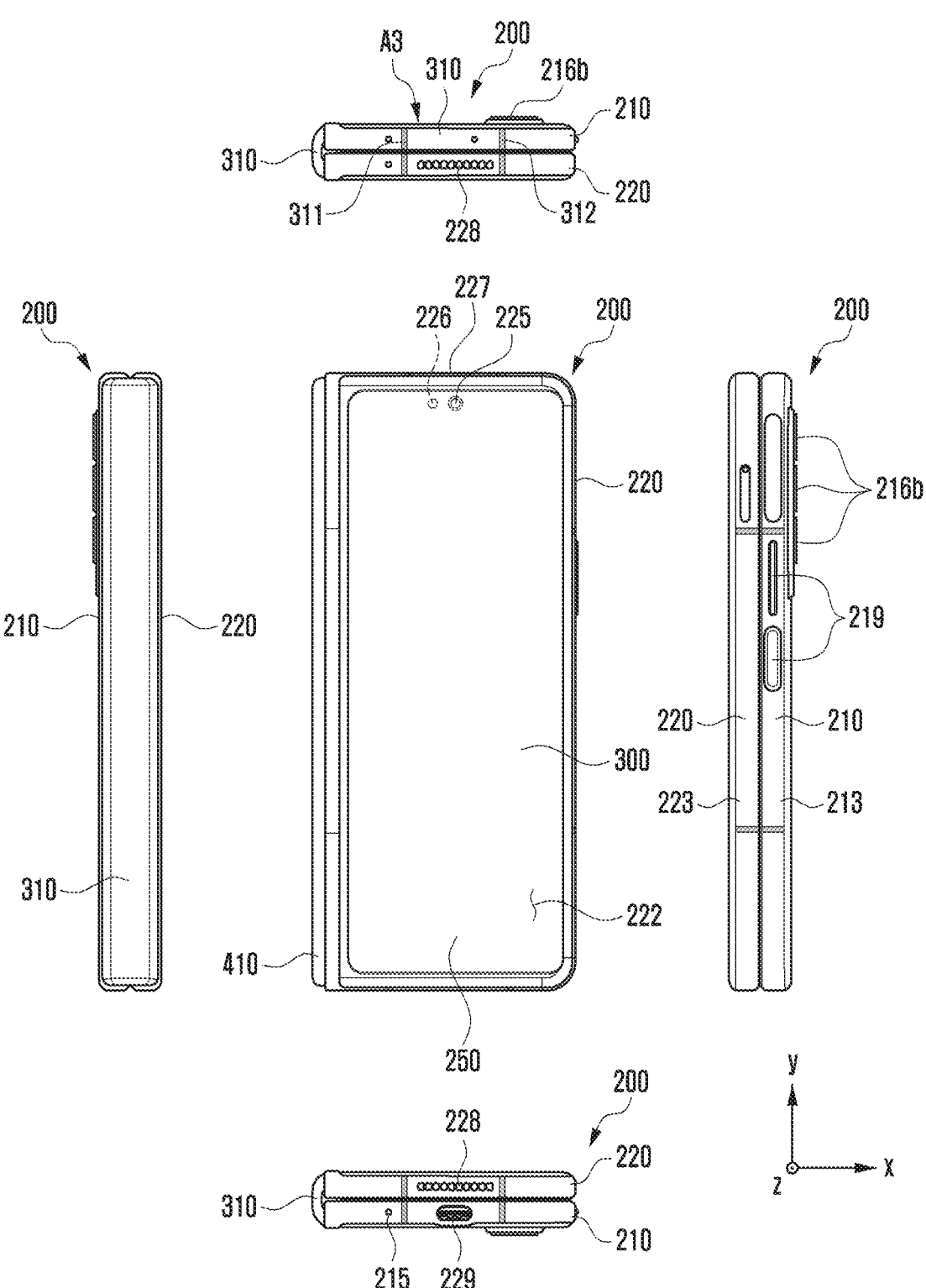
FIG. 3A is a view illustrating the front surface of the electronic device in a folded state according to an embodiment of the disclosure.
Figure 3B:
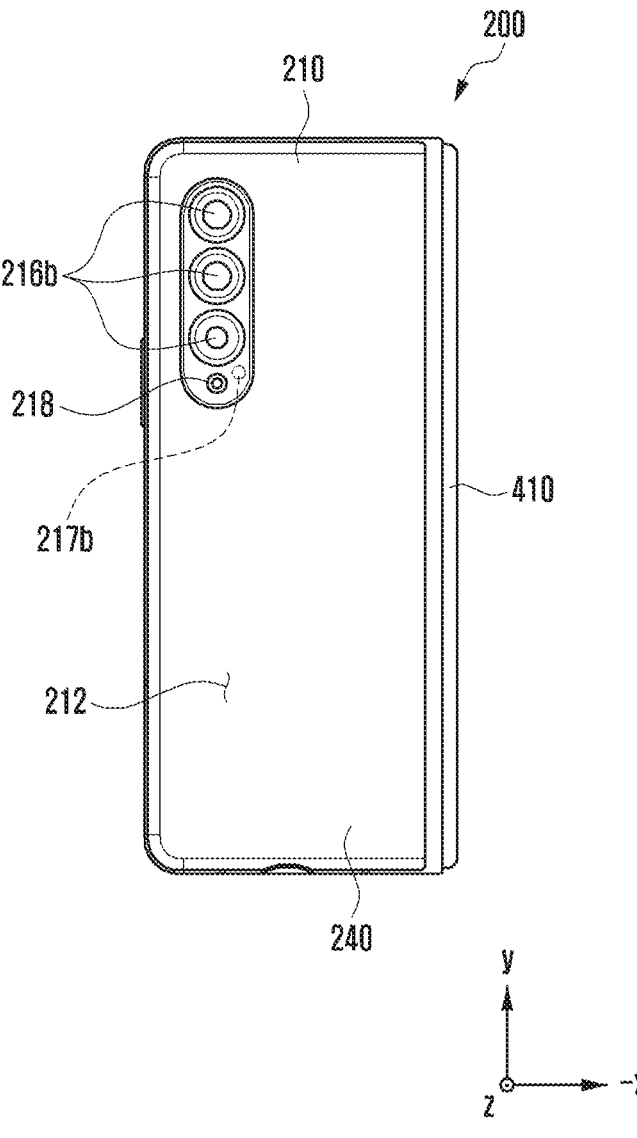
FIG. 3B is a view illustrating the rear surface of the electronic device in the folded state according to an embodiment of the disclosure.

FIG. 3A is a view illustrating the front surface of the electronic device in a folded state according to an embodiment of the disclosure. FIG. 3B is a view illustrating the rear surface of the electronic device in the folded state according to an embodiment of the disclosure.

Referring to FIGS. 2A, 2B, 3A,and 3B, an electronic device 200 may include a first housing 210 (e.g., a first housing portion or a first housing structure) and a second housing 220 (e.g., a second housing portion or a second housing structure) which are coupled to each other to be rotatable about a folding axis F via at least one hinge module (e.g., the hinge modules 400, 400-1, and 400-2 in FIG. 4) (e.g., a hinge device or a hinge structure). In an embodiment, the first housing 210 and the second housing 220 may be configured as a housing (e.g., a foldable housing) of the electronic device 200. In an embodiment, the electronic device 200 may include a first display 230 (e.g., a flexible display, a foldable display, or a main display) disposed to be supported by being accommodated in the first housing and the second housing. In an embodiment, the electronic device 200 may include a second display 300 (e.g., a sub-display) disposed through the second housing 220. In an embodiment, the electronic device 200 may include a hinge housing 410 (e.g., a hinge cover) which is disposed to be at least partially invisible from the outside through the first housing 210 and the second housing 220 in the unfolded state, and covers the at least one hinge module (e.g., the hinge modules 400, 400-1, and 400-2 in FIG. 4) to be invisible from the outside in the folded state or while being folded. Herein, the surface on which the first display 230 is disposed may be defined as the front surface of the electronic device 200, and the surface opposite to the front surface may be defined as the rear surface of the electronic device 200. In addition, the surface surrounding the space between the front surface and the rear surface may be defined as the side surface of the electronic device 200.

According to various embodiments, the first housing 210 and the second housing 220 may be disposed on opposite sides of the folding axis F, may have shapes that are generally symmetrical to each other with respect to the folding axis F, and may be folded to match each other. According to some embodiments, the first housing 210 and the second housing 220 may be folded asymmetrically with respect to the folding axis F. According to an embodiment, the first housing 210 and the second housing 220 may form an angle or have a distance therebetween, which may be variable depending on whether the electronic device 200 is in the unfolded state, in the folded state, or in the intermediate state.

According to various embodiments, the first housing 210 may be connected to the at least one hinge module (e.g., the hinge modules 400, 400-1, and 400-2 in FIG. 4) and may include a first surface 211 disposed to face the front of the electronic device 200 when the electronic device 200 is in the unfolded state, a second surface 212 facing away from the first surface 211, and/or a first side surface member 213 surrounding at least a portion of a first space 2101 between the first surface 211 and the second surface 212. According to an embodiment, the second housing 220 may be connected to the at least one hinge module (e.g., the hinge modules 400, 400-1, and 400-2 in FIG. 4) and may include a third surface disposed to face the front of the electronic device 200 when the electronic device 200 is in the unfolded state, a fourth surface 222 facing away from the third surface 221, and/or a second side surface member 223 surrounding at least a portion of a second space 2201 between the third surface 221 and the fourth surface 222. In an embodiment, the first surface 211 may be oriented in substantially the same direction as the third surface 221 in the unfolded state and may at least partially face the third surface 221 in the folded state. In an embodiment, the electronic device 200 may include a recess 201 provided to accommodate the first display 230 through structural coupling of the first housing 210 and the second housing 220. In an embodiment, the recess 201 may have substantially the same size as the first display 230. In an embodiment, the first housing 210 may include a first protection frame 213a (e.g., a first decoration member) which is coupled to the first side surface member 213 and disposed to overlap the edges of the first display 230 when the first display 230 is viewed from above, thereby covering the edges of the first display 230 to be invisible from the outside. In an embodiment, the first protection frame 213a may be integrated with the first side surface member 213. In an embodiment, the second housing 220 may include a second protection frame 223*a* (e.g., a second decoration member) which is coupled to the second side surface member 223 and disposed to overlap the edges of the first display 230 when the first display 230 is viewed from above, thereby covering the edges of the first display 230 to be invisible from the outside. In an embodiment, the second protection frame 223*a* may be integrated with the second side surface member 223. In some embodiments, the first protection frame 213*a* and the second protection frame 223*a* may be omitted.

Figure 4:
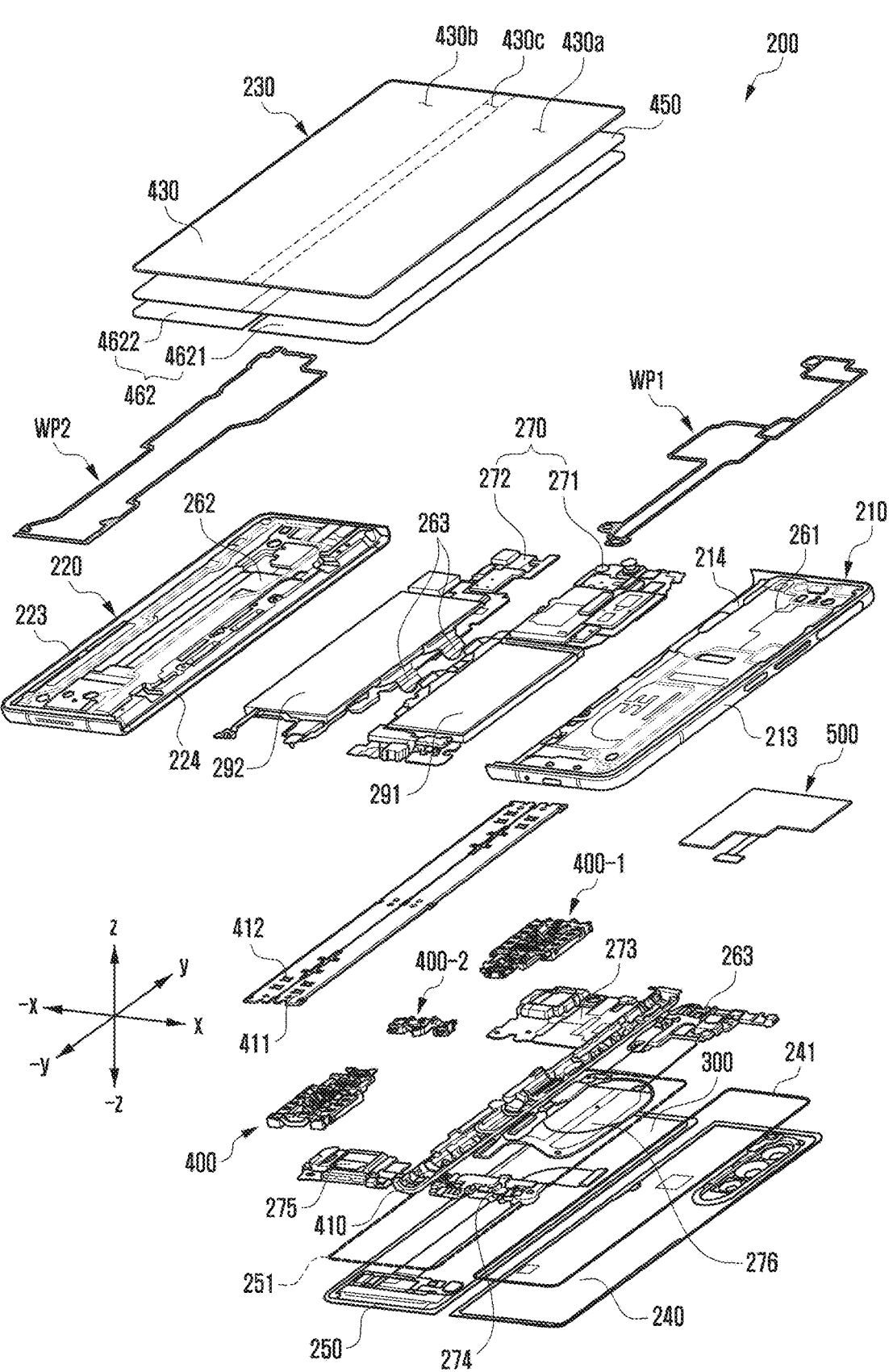
FIG. 4 is an exploded perspective view of the electronic device according to an embodiment of the disclosure.

According to various embodiments, the hinge housing 410 (e.g., a hinge cover) may be disposed between the first housing 210 and the second housing 220 to cover a portion of the at least one hinge module (e.g., the hinge modules 400, 400-1, and 400-2 in FIG. 4). In an embodiment, the hinge housing 410 may be covered by a portion of the first housing 210 and the second housing 220 or exposed to the outside, depending on whether the electronic device 200 is in the unfolded state, the folded state, or the intermediate state. For example, when the electronic device 200 is in the unfolded state, at least a portion of the hinge housing 410 may be disposed to be covered by the first housing 210 and the second housing 220 to be substantially invisible from the outside. In an embodiment, when the electronic device 200 is in the folded state, at least a portion of the hinge housing 410 may be disposed between the first housing 210 and the second housing 220 to be visible from the outside. In an embodiment, when the electronic device is in the intermediate state in which the first housing 210 and the second housing 220 are folded with a certain angle, the hinge housing 410 may be disposed between the first housing 210 and the second housing 220 to be at least partially visible from the outside of the electronic device 200. For example, the area of the hinge housing 410 exposed to the outside may be smaller than that in the case where the electronic device is fully folded. In an embodiment, the hinge housing 410 may include a curved surface.

According to various embodiments, the electronic device 200 may include at least one of the following components: one or more displays 230 and 300, input devices 215, sound output devices 227 and 228, sensor modules 217*a*, 217*b*, and 226, camera modules 216*a*, 216*b*, and 225, key input devices 219, indicators (not illustrated), or connector ports 229 which are disposed on or in the first housing 210 and/or the second housing 220. In some embodiments, the electronic device 200 may additionally include at least one other component. In some embodiments, at least one of the above-described components may be omitted.

According to various embodiments, the one or more displays 230 and 300 may include a first display 230 (e.g., a flexible display) disposed to be supported by the first surface 211 of the first housing 210 and the third surface 221 of the second housing 220, and a second display 300 disposed in the inner space of the second housing 220 to be at least partially visible from the outside through the fourth surface 222. In some embodiments, the second display 300 may be disposed in the inner space of the first housing 210 to be visible from the outside through the second surface 212. In an embodiment, the first display 230 may be mainly used when the electronic device 200 is in the unfolded state, and the second display 300 may be mainly used when the electronic device 200 is in the folded state. In an embodiment, when the electronic device 200 is in the intermediate state, the electronic device 200 may be controlled such that the first display 230 and/or the second display 300 can be used based on the folding angle between the first housing 210 and the second housing 220.

According to various embodiments, the first display 230 may be placed in an accommodation space defined by the pair of housings 210 and 220. For example, the first display 230 may be disposed in the recess 201 defined by the pair of housings 210 and 220 and may be disposed to occupy substantially most of the front surface of the electronic device 200 in the unfolded state. In an embodiment, the first display 230 may include a flexible display in which at least a partial area may be transformed into a flat shape or a curved shape. In an embodiment, the first display 230 may include a first area 230*a* corresponding to the first housing 210 and a second area 230*b* corresponding to the second housing 220. In an embodiment, the first display 230 may include a folding area 230*c* including a portion of the first area 230*a* and a portion of the second area 230*b* with reference to the folding axis F. In an embodiment, at least a portion of the folding area 230*c* may include an area corresponding to the at least one hinge module (e.g., the hinge modules 400, 400-1, and 400-2 in FIG. 4). In an embodiment, the area division of the first display 230 is only a division based on the pair of housings 210 and 220 and the at least one hinge module (e.g., hinge modules 400, 400-1, 400-2 in FIG. 4). The first display 230 may display a single seamless screen substantially through the pair of housings 210 and 220 and the at least one hinge module (e.g., hinge modules 400, 400-1, and 400-2 in FIG. 4). In an embodiment, the first area 230*a* and the second area 230*b* may have an overall symmetrical shape or a partially asymmetrical shape with respect to the folding area 230*c* and/or the folding axis F.

According to various embodiments, the electronic device 200 may include a first rear surface cover 240 disposed on the second surface 212 of the first housing 210 and a second rear surface cover 250 disposed on the fourth surface 222 of the second housing 220. In some embodiments, at least a portion of the first rear surface cover 240 may be integrated with the first side surface member 213. In some embodiments, at least a portion of the second rear surface cover 250 may be integrated with the second side surface member 223. In an embodiment, at least one of the first rear surface cover 240 and the second rear surface cover 250 may be made of a substantially transparent plate (e.g., a glass plate including various coating layers, or a polymer plate) or an opaque plate. In an embodiment, the first rear surface cover 240 may be made of, for example, coated or colored glass, ceramic, polymer, metal (e.g., aluminum, stainless steel (STS), or magnesium), or an opaque plate such as a combination of two or more of these materials. In an embodiment, the second rear surface cover 250 may be made of a substantially transparent plate of, for example, glass or polymer. Accordingly, the second display 300 may be disposed in the inner space of the second housing 220 to be visible from the outside through the second rear surface cover 250.

According to various embodiments, the input device 215 may include a microphone. In some embodiments, the input devices 215 may include a plurality of microphones disposed to detect the direction of sound. In an embodiment, the sound output devices 227 and 228 may include speakers. In an embodiment, the sound output devices 227 and 228 may include a call receiver 227 disposed through the fourth surface 222 of the second housing 220, and an external speaker 228 disposed through at least a portion of the second side surface member 223 of the second housing 220. In some embodiments, the input devices 215, the sound output devices 227 and 228, and the connector ports 229 may be disposed in the spaces of the first housing 210 and/or the second housing 220, and may be exposed to the external environment through one or more holes provided in the first housing 210 and/or the second housing 220. In some embodiments, the holes provided in the first housing 210 and/or the second housing 220 may be commonly used for the input device 215 and the sound output devices 227 and 228. In some embodiments, the sound output devices 227 and 228 may include a speaker that operates without holes provided in the first housing 210 and/or the second housing 220 (e.g., a piezo speaker).

According to various embodiments, the camera modules 216a, 216b, and 225 may include a first camera module 216a disposed on the first surface 211 of the first housing 210, a second camera module 216b disposed on the second surface 212 of the first housing 210, and/or a third camera module 225 disposed on the fourth surface 222 of the second housing 220. In an embodiment, the electronic device 200 may include a flash 218 located near the second camera module 216b. In an embodiment, the flash 218 may include, for example, a light-emitting diode or a xenon lamp. In an embodiment, the camera modules 216a, 216b, and 225 may each include one or more lenses, an image sensor, and/or an image signal processor. In some embodiments, at least one of the camera modules 216a, 216b, and 225 may include two or more lenses (e.g., wide-angle and telephoto lenses) and image sensors, and the camera modules may be disposed together on one surface of the first housing 210 and/or the second housing 220.

According to various embodiments, the sensor modules 217a, 217b, and 226 may generate electrical signals or data values corresponding to an internal operating state or an external environmental state of the electronic device 200. In an embodiment, the sensor modules 217a, 217b, and 226 may include a first sensor module 217a disposed on the first surface 211 of the first housing 210, a second sensor module 217b disposed on the second surface 212 of the first housing 210, and/or a third sensor module 226 disposed on the fourth surface 222 of the second housing 220. In some embodiments, the sensor modules 217a, 217b, and 226 may include at least one of a gesture sensor, a grip sensor, a color sensor, an infrared (IR) sensor, an illumination sensor, an ultrasonic sensor, an iris recognition sensor, or a distance detection sensor (e.g., a time-of-flight (TOF) sensor or a light detection and ranging (LiDAR) sensor).

According to various embodiments, the electronic device 200 may further include at least one of sensor modules (not illustrated), for example, an air pressure sensor, a magnetic sensor, a biometric sensor, a temperature sensor, a humidity sensor, or a fingerprint recognition sensor. In some embodiments, the fingerprint recognition sensor may be disposed through at least one of the first side surface member 213 of the first housing 210 and/or the second side surface member 223 of the second housing 220.

According to various embodiments, the key input devices 219 may be disposed to be exposed to the outside through the first side surface member 213 of the first housing 210. In some embodiments, the key input devices 219 may be disposed to be exposed to the outside through the second side surface member 223 of the second housing 220. In some embodiments, the electronic device 200 may not include some or all of the above-mentioned key input devices 219, and a key input device 219, which is not included, may be implemented in another form, such as a soft key, on at least one display 230 or 300. As an embodiment, the key input devices 219 may be implemented by using a pressure sensor included in the at least one display 230 or 300.

According to various embodiments, the connector ports 229 may include a connector (e.g., a USB connector or an interface connector port module (IF module)) configured to transmit/receive power and/or data to and from an external electronic device. In some embodiments, the connector ports 229 may perform a function for transmitting/receiving an audio signal to and from the external electronic device, or may further include a separate connector port (e.g., an ear jack hole) for an audio signal transmitting/receiving function.

According to various embodiments, one or more camera modules 216a and 225 among the camera modules 216a, 216b, and 225, one or more sensor modules 217a and 226 among the sensor modules 217a, 217b, and 226, and/or an indicator may be disposed to be exposed through the at least one display 230 or 300. For example, the at least one camera modules 216a or 225, the at least one sensor module 217a or 226, and/or the indicator may be disposed in the inner space of the at least one housing 210 or 220 below the active area (display area) of the at least one display 230 or 300, and may be disposed to come into contact with the external environment through an opening perforated up to the cover member (e.g., a window layer) and/or the second rear surface cover 250 or a transparent area. In an embodiment, an area in which the at least one display 230 or 300 and the at least one camera module 216a or 225 face each other may be provided as a transmission area with a predetermined transmittance as a portion of a content display area. In an embodiment, the transmission area may have a transmittance ranging from about 5% to about 20%. The transmission area may include an area overlapping the effective area (e.g., a view angle area) of the at least one camera module 216a or 225 through which light captured by an image sensor to generate an image passes. For example, the transmission area of the at least one display 230 or 300 may include an area having a lower pixel density than the periphery. For example, the transparent area may replace an opening. For example, the at least one camera module 216a or 225 may include an under-display camera (UDC) or an under-panel camera (UPC). As an embodiment, some camera modules 216a and 225 or sensor modules 217a and 226 may be arranged to perform the functions thereof without being visually exposed through a display. For example, the areas facing the camera modules 216a and 225 and/or the sensor modules 217a and 226 disposed under the displays 230 and 300 (e.g., a display panel) have an under-display camera (UDC) structure, and may not require a perforated opening.

According to various embodiments, when the electronic device 200 is in the unfolded state (e.g., the state in FIGS. 2A and 2B), the first housing 210 and the second housing 220 form an angle of about 180 degrees therebetween, and the first area 230a, the second area 230b, and the folding area 230c of the first display 230 may be arranged to be oriented in the same direction (e.g., the z-axis direction) while substantially forming the same plane. As an embodiment, when the electronic device 200 is in the unfolded state, the first housing 210 may rotate by an angle of about 360 degrees with respect to the second housing 220 to be folded in the opposite direction such that the second surface 212 and the fourth surface 222 face each other (out-folding type).

According to various embodiment, when the electronic device 200 is in the folded state (e.g., the state in FIGS. 3A and 3B), the first surface 211 of the first housing 210 and the third surface 221 of the second housing 220 may be disposed to face each other. In this case, the first area 230a and the second area 230b of the first display 230 may form a narrow angle (e.g., in the range of 0 degrees to about 10 degrees) with respect to each other via the folding area 230c, and may be disposed to face each other. In an embodiment, at least a portion of the folding area 230c may be transformed into a curved shape with a predetermined curvature. In an embodiment, when the electronic device 200 is in the intermediate state, the first housing 210 and the second housing 220 may be disposed to form a certain angle therebetween. In this case, the first area 230a and the second area 230b of the first display 230 may form an angle that is greater than that in the folded state and smaller than that in the unfolded state, and the curvature of the folding area 230c may be smaller than that in the folded state and greater than that in the unfolded state. In some embodiments, the first housing 210 and the second housing 220 may form an angle at which the first housing 210 and the second housing 220 can be stopped to form a predetermined folding angle between the folded state and the unfolded state via the at least one hinge module (e.g., the hinge modules 400, 400-1, and 400-2 in FIG. 4) (free stop function). In some embodiments, the first housing 210 and the second housing 220 may be continuously operated while being pressed in the unfolding direction or the folding direction with reference to a predetermined inflection angle via the at least one hinge module (e.g., the hinge modules 400, 400-1, and 400-2 in FIG. 4).

According to various embodiments, the electronic device 200 may include an antenna structure 500 disposed in the internal space thereof and configured to determine the position of an external electronic device and/or the distance to the external electronic device. In an embodiment, the antenna structure 500 may be disposed in the first space 2101 of the first housing 210 and arranged to transmit or receive wireless signals in the direction in which the first rear surface cover 240 is oriented (e.g., the –z-axis direction in FIG. 2B). For example, the wireless communication circuit (e.g., the wireless communication module 192 in FIG. 1) may be arranged to transmit or receive wireless signals in the direction in which the first rear surface cover 240 is oriented (e.g., the –z-axis direction in FIG. 2B) via the antenna structure 500. In an embodiment, the antenna structure 500 may include a plurality of first conductive patches (e.g., the sub-patches 510, 520, and 530 in FIG. 5A) configured to operate in a first frequency band, and a second conductive patch (e.g., the second conductive patch 540 in FIG. 5A) disposed between a pair of conductive patches (e.g., the first sub-patch 510 and the second sub-patch 520 in FIG. 5A) among the plurality of first conductive patches (e.g., the sub-patches 510, 520, and 530 in FIG. 5A) and configured to operate in a second frequency band different from the first frequency band. Accordingly, the electronic device 200 may include a first antenna A1 configured to operate in the first frequency band via the plurality of first conductive patches (e.g., the sub-patches 510, 520, and 530 in FIG. 5A), and a second antenna A2 configured to overate in the second frequency band via the second conductive patch (e.g., the second conductive patch 540 in FIG. 5A). In an embodiment, the first frequency band may include a frequency band in the range of about 7.75 GHz to 8.25 GHz (e.g., Ch 9). In an embodiment, the second frequency band may include a frequency band in the range of about 6.25 GHz to 6.75 GHz (e.g., Ch 5).

In various embodiments, the electronic device 200 may include a conductive portion 310 disposed in at least a portion of the first side surface member 213 and used as an antenna radiator. In an embodiment, the conductive portion 310 may be split in the first conductive side surface member 213 by a first split portion 311 (e.g., a first non-conductive portion) and a second split portion 312 (e.g., a second non-conductive portion). In an embodiment, the wireless communication circuit (e.g., the wireless communication module 192 in FIG. 1) may be configured to transmit or receive wireless signals in the first frequency band and/or the second frequency band via the conductive portion 310. Accordingly, the electronic device 200 may include a third antenna A3 operating in the first frequency band and/or the second frequency band via the conductive portion 310.

According to various embodiments, the electronic device 200 may include an ultra-wideband (UWB) antenna using at least two antennas among a first antenna A1, a second antenna A2, or a third antenna A3 and configured to detect the distance to an external electronic device or the position of the external electronic device based on a phase difference of received signals of respective antennas (e.g., an angle of arrival (AoA) positioning technique). In an embodiment, the second antenna A2 and the third antenna A3 and/or the first antenna A1 and the third antenna A3 may be configured to operate with diversity, thereby increasing the reception sensitivity of the UWB antenna.

FIG. 4 is an exploded perspective view of the electronic device according to an embodiment of the disclosure.

Referring to FIG. 4, the electronic device 200 may include a first display 230 (e.g., a flexible display), a second display 300, one or more hinge modules 400, 400-1, and 400-2, a pair of support members 261 and 262, at least one substrate 270 (e.g., a printed circuit board (PCB)), a first housing 210, a second housing 220, a first rear surface cover 240, and/or a second rear surface cover 250.

According to various embodiments, the first display 230 may include a display panel 430 (e.g., a flexible display panel) and a support plate 450 disposed below the display panel 430. In an embodiment, the first display 230 may include reinforcing plates 462 disposed below the support plate 450. In some embodiments, the reinforcing plates 462 may be omitted. In an embodiment, the display panel 430 may include a first panel area 430a corresponding to the first area (e.g., the first area 230a in FIG. 2A) of the first display 230, a second panel area 430b extending from the first panel area 430a and corresponding to the second area (e.g., the second area 230b in FIG. 2A) of the first display 230, and a third panel area 430c interconnecting the first panel area 430a and the second panel area 430b and corresponding to the folding area (e.g., the folding area 230c in FIG. 2A) of the first display 230. In an embodiment, the support plate 450 may be disposed between the display panel 430 and a pair of support members 261 and 262 and may be configured to have a material and a shape to provide a flat support structure for the first panel area 430a and the second panel area 430b and a bendable structure for supporting bendability of the third panel area 430c. In an embodiment, the support plate 450 may be made of a conductive material (e.g., metal) or a non-conductive material (e.g., polymer or fiber reinforced plastics (FRP)). In an embodiment, the reinforcing plates 462 may include, between the support plate 450 and the pair of support members 261 and 262, a first reinforcing plate 4621 disposed to correspond to at least a portion of the first panel area 430a and the third panel area 430c, and a second reinforcing plate 4622 disposed to correspond to at least a portion of the second panel area 430b and the third panel area 430c. In an embodiment, the reinforcing plates 462 may be made of a metal material (e.g., SUS) to help reinforce the ground connection structure and rigidity for the first display 230. In some embodiments, the electronic device 200 may include a digitizer (e.g., the digitizer 461 in FIG. 4) disposed below the support plate 450 in replacement for the support plate 462 or added between the support plate 450 and the reinforcing plates 462.

According to various embodiments, the second display 300 may be disposed in the space between the second housing 220 and the second rear surface cover 250. In an embodiment, the second display 300 may be disposed in the space between the second housing 220 and the second rear surface cover 250 to be visible from the outside through substantially the entire area of the second rear surface cover 250.

According to various embodiments, at least a portion of the first support member 261 may be foldably coupled to the second support member 262 via at least one hinge module 400, 400-1, or 400-2. In an embodiment, the electronic device 200 may include at least one wiring member 263 (e.g., a flexible printed circuit board (FPCB)) arranged from at least a portion of the first support member 261 to a portion of the second support member 262 across the at least one hinge module 400, 400-1, or 400-2. In an embodiment, the first support member 261 may extend from the first side surface member 213 or may be disposed in a manner of being structurally coupled with the first side surface member 213. In an embodiment, the electronic device 200 may include a first space (e.g., the first space 2101 in FIGS. 2A and 2B) provided by the first support member 261 and the first rear surface cover 240. In an embodiment, the first housing 210 (e.g., the first housing structure) may be configured through the coupling of the first side surface member 213, the first support member 261, and the first rear surface cover 240. In an embodiment, the second support member 262 may extend from the second side surface member 223 or may be disposed in a manner of being structurally coupled with the second side surface member 223. In an embodiment, the electronic device 200 may include a second space (e.g., the second space 2201 in FIGS. 2A and 2B) provided by the second support member 262 and the second rear surface cover 250. In an embodiment, the second housing 220 (e.g., the second housing structure) may be configured through the coupling of the second side surface member 223, the second support member 262, and the second rear surface cover 250. In an embodiment, the at least one wiring member 263 and/or the at least one hinge module 400, 400-1, or 400-2 may be disposed to be at least partially supported by at least a portion of the pair of support members 261 and 262. In an embodiment, the at least one wiring member 263 may be disposed to extend from the first support member 261 to the second support member 262 across the folding axis (e.g., the folding axis F in FIG. 2A). In an embodiment, the at least one wiring member 263 may be disposed to have a length in a direction (e.g., the x-axis direction) substantially perpendicular to the folding axis (e.g., the y-axis or the folding axis F of FIGS. 2A and 2B).

According to various embodiments, the at least one substrate 270 may include a first substrate 271 disposed in the first space 2101 and a second substrate 272 disposed in the second space 2201. At least one of the first substrate 271 or the second substrate 272 may be a board. In an embodiment, the first substrate 271 and the second substrate 272 may include a plurality of electronic components arranged to implement various functions of the electronic device 200. In an embodiment, the first substrate 271 and the second substrate 272 may be electrically connected to each other via the at least one wiring member 263.

According to various embodiments, the electronic device 200 may include at least one battery 291 or 292. In an embodiment, the at least one battery 291 or 292 may include a first battery 291 disposed in the first space 2101 of the first housing 210 and electrically connected to the first substrate 271 and a second battery disposed in the second space 2201 of the second housing 220 and electrically connected to the second substrate 272. In an embodiment, the first support member 261 and the second support member 262 may further include one or more swelling holes for the first battery 291 and the second battery 292.

According to various embodiments, the first housing 210 may include a first rotation support surface 214, and the second housing 220 may include a second rotation support surface 224 corresponding to the first rotation support surface 214. In an embodiment, the first rotation support surface 214 and the second rotation support surface 224 may each include a curved surface corresponding to (naturally connected to) the curved outer surface of the hinge housing 410. In an embodiment, when the electronic device 200 is in the unfolded state, the first rotation support surface 214 and the second rotation support surface 224 may cover the hinge housing 410 to prevent the hinge housing 410 from being exposed to the rear surface of the electronic device 200 or to expose only a portion of the hinge housing 410 to the rear surface of the electronic device 200. In an embodiment, when the electronic device 200 is in the folded state, the first rotation support surface 214 and the second rotation support surface 224 may rotate along the curved outer surface of the hinge housing 410 to at least partially expose the hinge housing 410 to the rear surface of the electronic device 200.

According to various embodiments, the electronic device 200 may include at least one antenna 276 disposed in the first space 2201. In an embodiment, the at least one antenna 276 may be disposed on the first battery 291 and the first rear surface cover 240 in the first space 2201. In an embodiment, the at least one antenna 276 may include, for example, a near-field communication (NFC) antenna, a wireless charging antenna, and/or a magnetic secure transmission (MST) antenna. In an embodiment, the at least one antenna 276 may execute, for example, short-range communication with an external device or wireless transmission/reception of power required for charging. In some embodiments, an antenna structure may be configured by at least a portion of the first side surface member 213 or the second side surface member 223 and/or a portion of the first support member 261 and the second support member 262 or a combination thereof.

According to various embodiments, the electronic device 200 may further include one or more electronic component assemblies 274 and 275 and/or additional support members 263 and 273 disposed in a first space (e.g., the first space 2101 of FIGS. 2A and 2B) and/or a second space (e.g., the second space 2201 of FIGS. 2A and 2B). For example, the one or more electronic component assemblies may include an interface connector port assembly 274 or a speaker assembly 275.

According to various embodiments, the electronic device 200 may include a first waterproof member WP1 disposed between the first reinforcing plate 4621 and the first support member 261 and a second waterproof member WP2 disposed between the second reinforcing plate 4622 and the second support member 262. In an embodiment, the first waterproof member WP1 may provide at least one first waterproof space between the first reinforcing plate 4621 and the first support member 261. In an embodiment, the at least one first waterproof space may accommodate an area corresponding to at least one electronic component (e.g., a camera module or a sensor module) disposed to be supported by the first support member 261. In an embodiment, the second waterproof member WP2 may provide a second waterproof space between the second reinforcing plate 4622 and the second support member 262. In an embodiment, the second waterproof space may accommodate at least a portion of a bending portion folded to the rear surface of the first display 230. For example, the second waterproof space may be disposed to surround at least a portion of the bending portion (e.g., the bending portion 432 in FIG. 4) extending from the display panel 430 of the first display 230 and folded to the rear surface. Accordingly, a control circuit (e.g., a display driver IC (DDI)) and/or a plurality of electrical elements) disposed in the bending portion 432 may be protected from external moisture and/or foreign substances by being disposed in the second waterproof space.

According to various embodiments, the electronic device 200 may include a waterproof tape 241 disposed between the first rear surface cover 240 and the first housing 210. In an embodiment, the electronic device 200 may include a bonding member 251 disposed between the second rear surface cover 250 and the second housing 220. In some embodiments, the bonding member 251 may be disposed between the second display 300 and the second housing 220. In some embodiments, the waterproof tape 241 may be replaced with the bonding member 251, and the bonding member 251 may be replaced with the waterproof tape 241.

According to various embodiments, the at least one hinge module 400, 400-1, or 400-2 may include a first hinge module 400 disposed at one end in a direction parallel to the folding axis (e.g., the folding axis F in FIG. 2A), a second hinge module 400-1 disposed at the other end, and a third hinge module 400-2 disposed between the first hinge module 400 and the second hinge module 400-1. In an embodiment, the first hinge module 400, the second hinge module 400-1, and the third hinge module 400-2 may have substantially the same configuration. In some embodiments, the third hinge module 400-2 may be replaced with a connection module. In this case, the connection module may be arranged through a combination of one or more gears and/or a combination of one or more links. In an embodiment, the electronic device 200 may include a first hinge plate 411 and a second hinge plate 412 connected via the at least one hinge module 400, 400-1, or 400-2. In an embodiment, the first hinge plate 411 and the second hinge plate 412 may define the same plane as the first housing 210 and the second housing in the unfolded state.

According to various embodiments, the electronic device 200 may include an antenna structure 500 disposed in an inner space (e.g., the first space 2101 in FIGS. 2A and 2B) of the first housing 210. In an embodiment, the antenna structure 500 may be disposed in the space between the first rear surface cover 240 and the first support member 261 to transmit or receive wireless signals in the direction in which the first rear surface cover 240 is oriented (e.g., the −z-axis direction). In some embodiments, when the arrangement space is allowed, the antenna structure 500 may be disposed in the space between the second rear surface cover 250 and the second support member 262 to transmit or receive wireless signals in the direction in which the second rear surface cover 250 is oriented (e.g., the −z-axis direction).

Figure 5A:
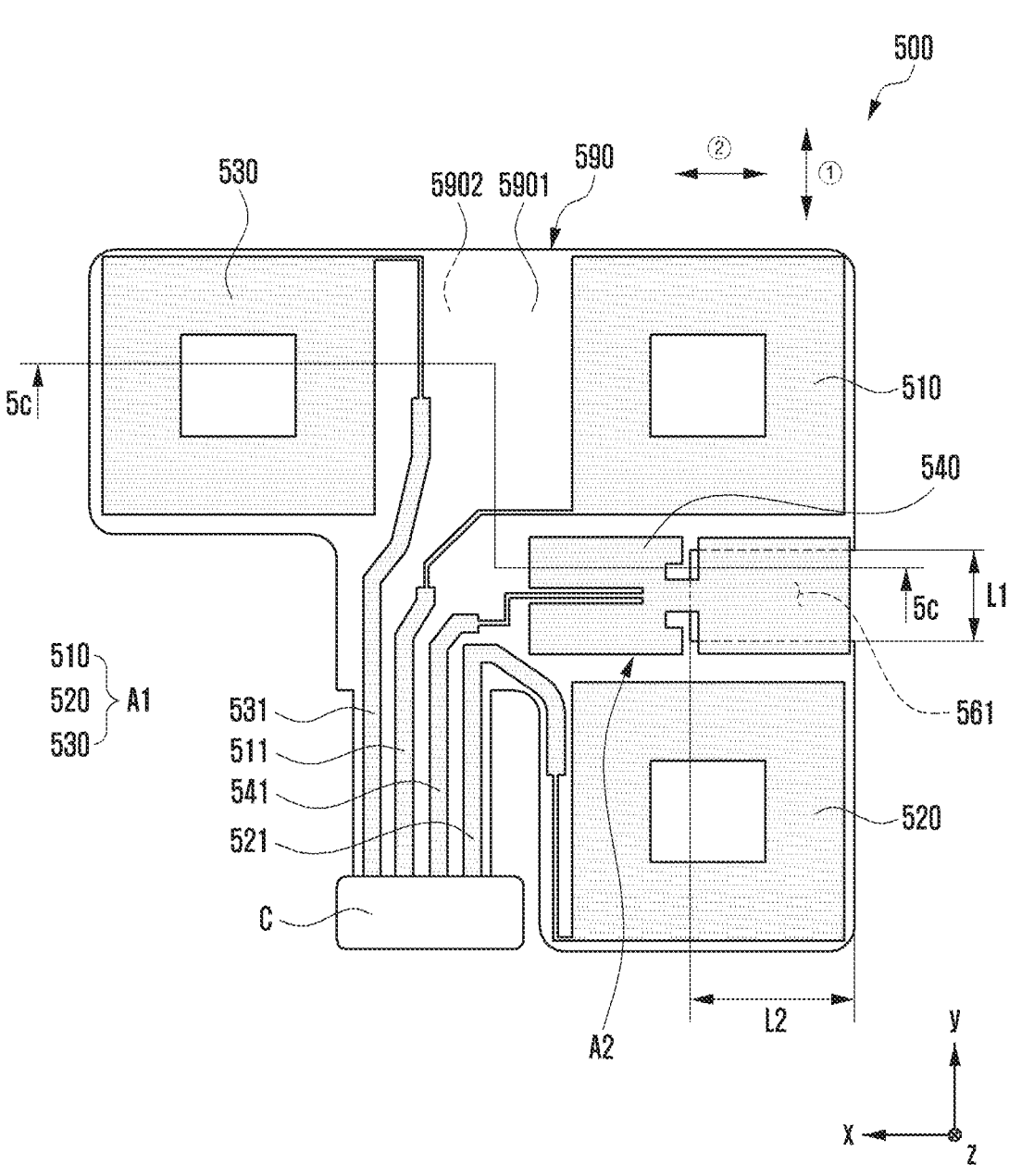
FIG. 5A is a view illustrating the configuration of an antenna structure according to an embodiment of the disclosure.
Figure 5B:
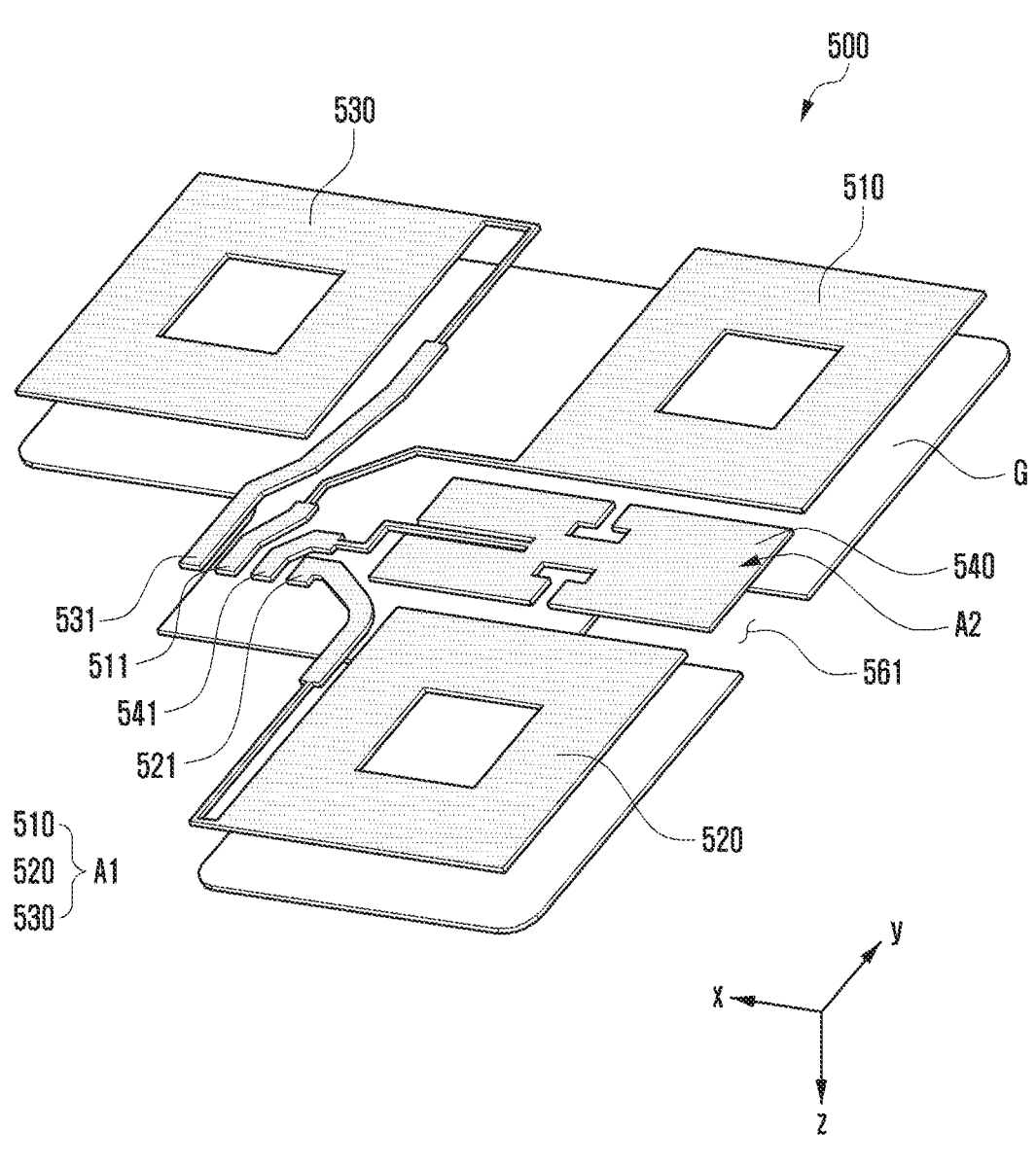
FIG. 5B is a perspective view of the antenna structure according to an embodiment of the disclosure.
Figure 5C:
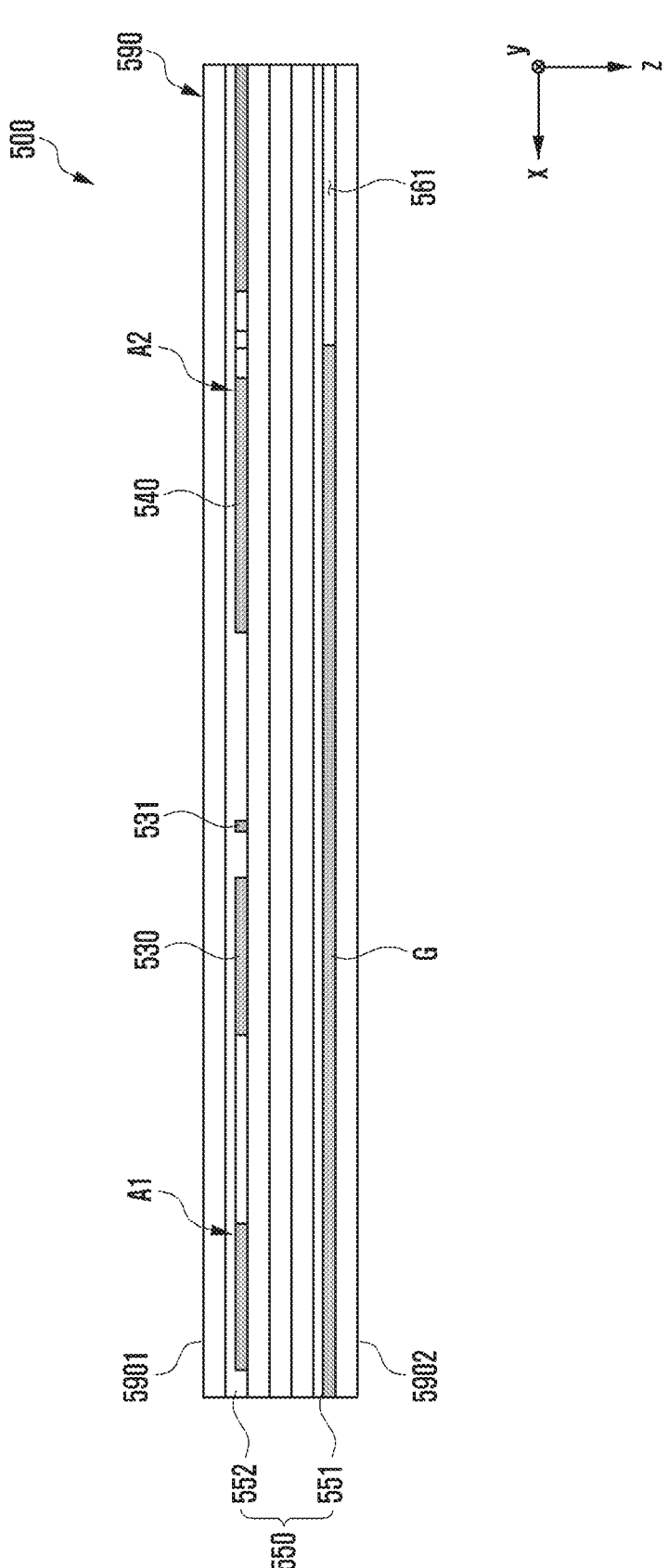
FIG. 5C is a cross-sectional view of the antenna structure, taken along line 5c-5c in FIG. 5A according to an embodiment of the disclosure.

FIG. 5A is a view illustrating the configuration of an antenna structure according to an embodiment of the disclosure. FIG. 5B is a perspective view of the antenna structure according to an embodiment of the disclosure. FIG. 5C is a cross-sectional view of the antenna structure, taken along line 5c-5c in FIG. 5A according to an embodiment of the disclosure.

Referring to FIGS. 5A to 5C, the antenna structure 500 (e.g., an antenna module or an antenna) may include a dielectric substrate 590 (e.g., a substrate) including a plurality of insulating layers 550 arranged in a stacked manner and including a first substrate surface 5901 and a second substrate surface 5902 facing away from the first substrate surface 5901. In an embodiment, the dielectric substrate 590 may be a flexible substrate (e.g., a flexible printed circuit board (FPCB)). In an embodiment, the dielectric substrate 590 may be a rigid substrate (e.g., a printed circuit board (PCB)). In an embodiment, the antenna structure 500 may include a ground layer (ground plane) G disposed on the first insulating layer 551 among the plurality of insulating layers 550. In an embodiment, the antenna structure 500 may include a first conductive patch including a plurality of first conductive patches 510, 520, and 530 disposed on a second insulating layer 552, which is different from the first insulating layer 551, among the plurality of insulating layers 550, and a second conductive patch 540 disposed between a pair of conductive patches 510 and 520 among the plurality of first conductive patches 510, 520, and 530. In an embodiment, the second insulating layer 552 may be disposed between the first insulating layer 551 and the first substrate surface 5901. In an embodiment, the second insulating layer 552 may include the first substrate surface 5901. In an embodiment, the plurality of first conductive patches 510, 520, and 530 and the second conductive patch 540 may be disposed on different insulating layers between the first substrate surface 5901 and the first insulating layer 552. In an embodiment, the plurality of first conductive patches 510, 520, and 530 and the second conductive patch 540 may be arranged to transmit or receive wireless signals in a direction in which the first substrate surface 5901 is oriented (e.g., the −z-axis direction). In an embodiment, when the first substrate surface 5901 is viewed from above, the ground layer G may be disposed to overlap the plurality of first conductive patches 510, 520, and 530 and to overlap a portion of the second conductive patch 540. In an embodiment, the plurality of first conductive patches 510, 520, and 530 may be used as a first antenna A1 (e.g., an array antenna) that operates as a circular polarization (CP) antenna. In some embodiments, the plurality of first conductive patches 510, 520, and 530 may operate as a linear-polarization (LP) antenna. In an embodiment, the second conductive patch 540 may be used as a second antenna A2 (e.g., a monopole antenna). In an embodiment, the first antenna A1 may operate in a first frequency band (e.g., Ch 9, a frequency band in the range of about 7.75 GHz to 8.25 GHz), and the second antenna A2 may operate in a second frequency (e.g., Ch 5, a frequency band in the range of about 6.25 GHz to 6.75 GHz) different from the first frequency band.

According to various embodiments, the plurality of first conductive patches 510, 520, and 530 may include a first sub-patch 510 and a second sub-patch 520 spaced apart from each other by a predetermined interval along a first direction (e.g., direction ①). In an embodiment, the plurality of first conductive patches 510, 520, and 530 may include a third sub-patch 530 spaced apart from the first sub-patch 510 by a predetermined interval in a second direction (e.g., direction ②) perpendicular to the first direction (e.g., direction ①). For example, the separation distance between the first sub-patch 510 and the second sub-patch 520 may be substantially the same as the separation distance between the first sub-patch 510 and the third sub-patch 530. In an embodiment, the second conductive patch 540 may be at least partially disposed in the space between the first sub-patch 510 and the second sub-patch 520.

According to various embodiments, the first sub-patch 510 may be electrically connected to a connector C via a first wire 511 (e.g., a first electrical path or first wiring structure) disposed on the dielectric substrate 590. According to an embodiment, the second sub-patch 520 may be electrically connected to the connector C via a second wire 521 (e.g., a second electrical path or second wiring structure) disposed on the dielectric substrate 590. According to an embodiment, the third sub-patch 530 may be electrically connected to the connector C via a third wire 531 (e.g., a third electrical path or third wiring structure) disposed on the dielectric substrate 590. According to an embodiment, the second conductive patch 540 may be electrically connected to the connector C via a fourth wire 541 (e.g., a fourth electrical path or fourth wiring structure) disposed on the dielectric substrate 590. In an embodiment, when the antenna structure 500 is disposed in the first housing (e.g., the first housing 210 in FIG. 4), the connector C may be electrically connected to a wireless communication circuit (e.g., the wireless communication module 192 in FIG. 1) on the first substrate (e.g., the first substrate 271 in FIG. 4) by being connected to the first substrate (e.g., the first substrate 271 in FIG. 4) disposed in the first housing (e.g., the first housing 210 in FIG. 4).

According to various embodiments, the second conductive patch 540 may be disposed in the narrow space between the first sub-patch 510 and the second sub-patch 520, and may be reduced in radiation performance due to the limitation of the vertical distance from the ground layer G. To address this problem, the antenna structure 500 may include a non-conductive area 561 disposed to overlap at least a portion of the second conductive patch 540 when the first substrate surface 5901 is viewed from above. In an embodiment, the non-conductive area 561 may be provided by removing or omitting the ground layer G. In an embodiment, the second conductive patch 540 may be operated as a monopole antenna via the non-conductive area 561. In an embodiment, the non-conductive area 561 is provided in a rectangular shape in the second direction (e.g., direction ②) perpendicular to an edge of the dielectric substrate 590 extending along the first direction (e.g., direction ①), but is not limited thereto. For example, the non-conductive area 561 may be provided in various shapes that overlap the second conductive patch 540.

According to various embodiments, the non-conductive area 561 may be provided at the edge of the dielectric substrate 590 extending along the first direction (e.g., direction ①), in which the first sub-patch 510 and the second sub-patch 520 are disposed, to have a first length L1 and to have a second length L2 along the second direction (e.g., direction ②) perpendicular to the first direction (① direction). In an embodiment, the first length L1 may be smaller than the second length L2. In some embodiments, the first length L1 and the second length L2 may be substantially equal to each other. In some embodiments, the first length L1 may be larger than the second length L2. In an embodiment, the second length L2 may have a length of about λ/4 based on the operating frequency band of the first antenna A1. In some embodiments, the second length L2 may have a length larger than λ/4 based on the operating frequency band of the first antenna A1. This definition of length may help improve the isolation between the first sub-patch 510 and the second sub-patch 520.

Figure 5D:
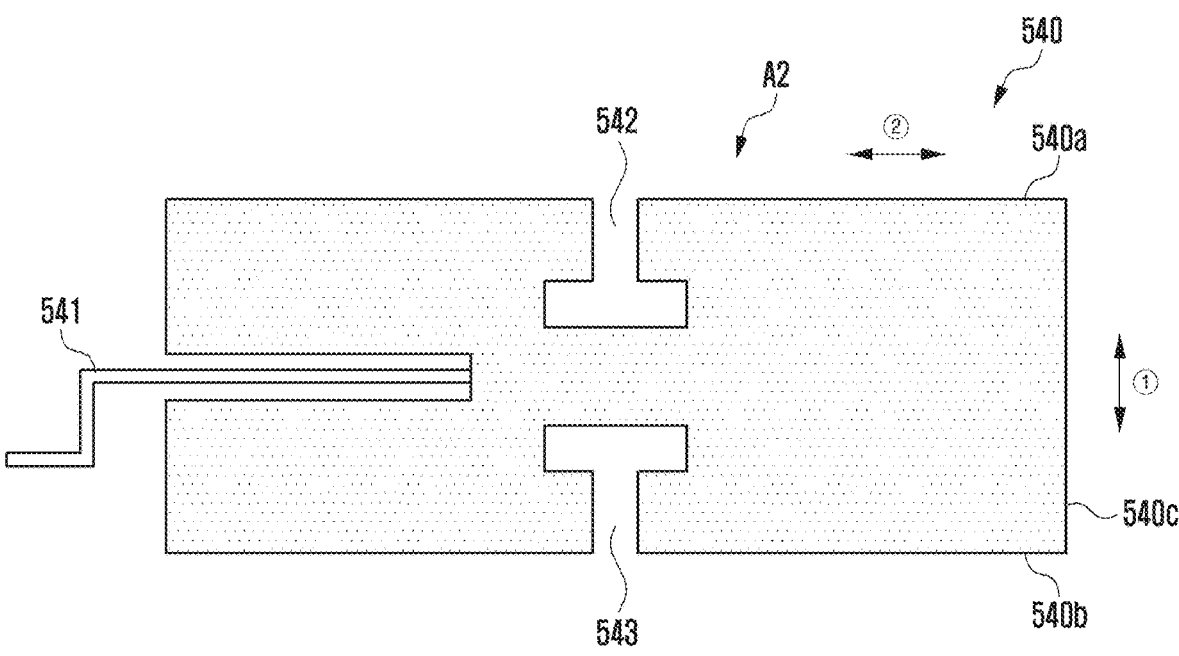
FIG. 5D is a view illustrating the configuration of a second conductive patch according to an embodiment of the disclosure.

FIG. 5D is a view illustrating the configuration of the second conductive patch according to an embodiment of the disclosure.

Referring to FIG. 5D, the second conductive patch 540 may include at least one slot 542 or 543. In an embodiment, the at least one slot 542 or 543 may include a first slot 542 provided in the first direction (e.g., direction ①) along a first edge 540a of the second conductive patch 540 provided in the second direction (e.g., direction ②), and a second slot 543 provided in the first direction (e.g., direction ①) along a second edge 540b of the second conductive patch 540 provided in the second direction (e.g., direction ②) and opposite to the first edge 540a. In an embodiment, the second antenna A2 using the second conductive patch 540 may be configured such that its resonance frequency is adjusted via the shape and length of the first slot 542 and/or the second slot 543. In some embodiments, the slots 542 and 543 may be provided to have a predetermined shape and/or length in the second direction (e.g., direction ②) from a third edge 540c provided in the first direction (e.g., direction ①) between the first edge 540a and the second edge 540b.

According to various embodiments, the antenna structure 500 may be used as a UWB antenna operating in dual bands via the first antenna A1 using the plurality of first conductive patches 510, 520, and 530 and the second antenna A2 using the second of plurality conductive patches 540. In an embodiment, the UWB antenna may use the first antenna A1 and a second antenna A2 to determine the location of an external electronic device and the distance to the external electronic device based on the phase difference of the signals received from the external electronic device.

Figure 6A:
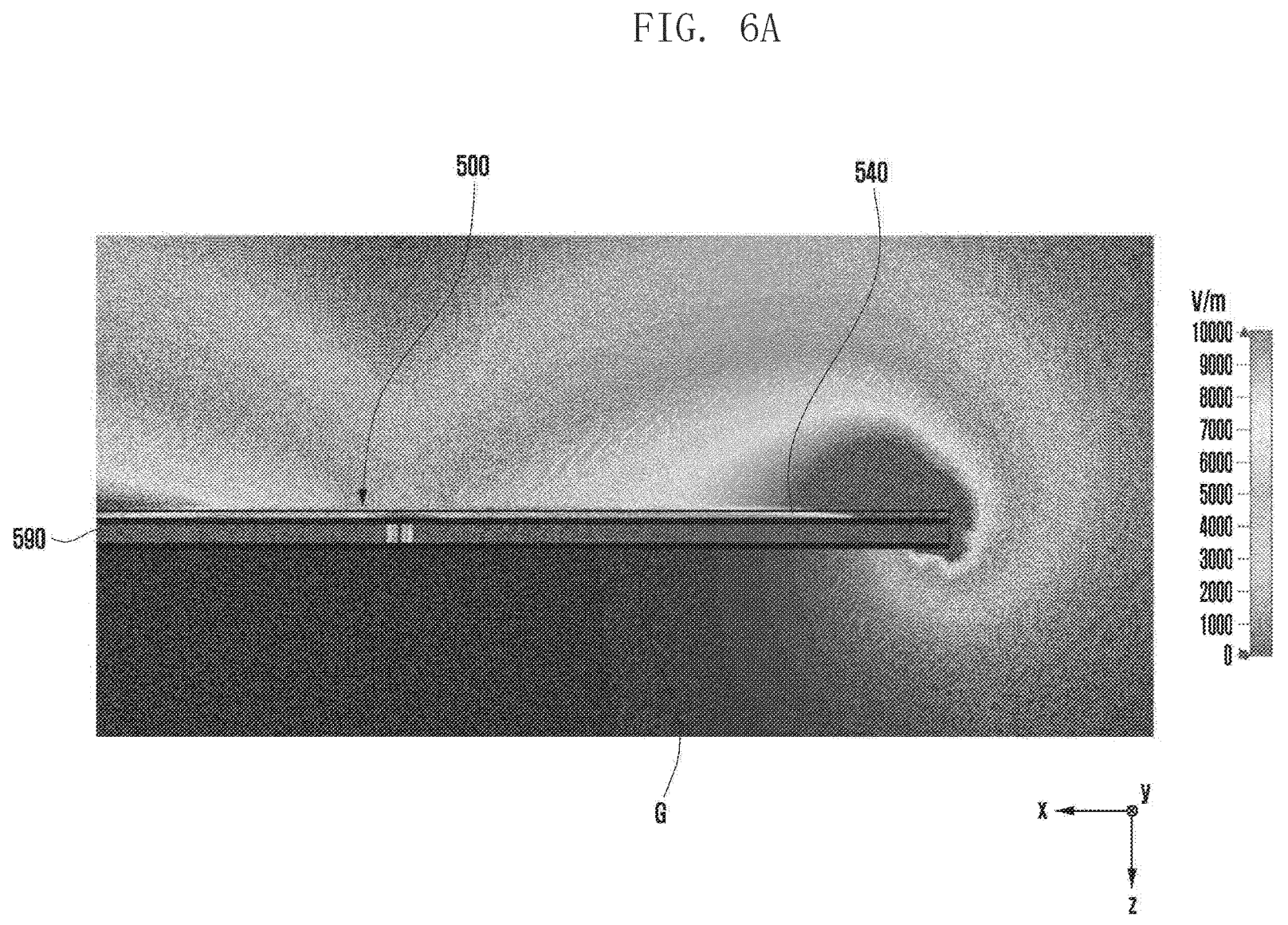
Figure 6B:
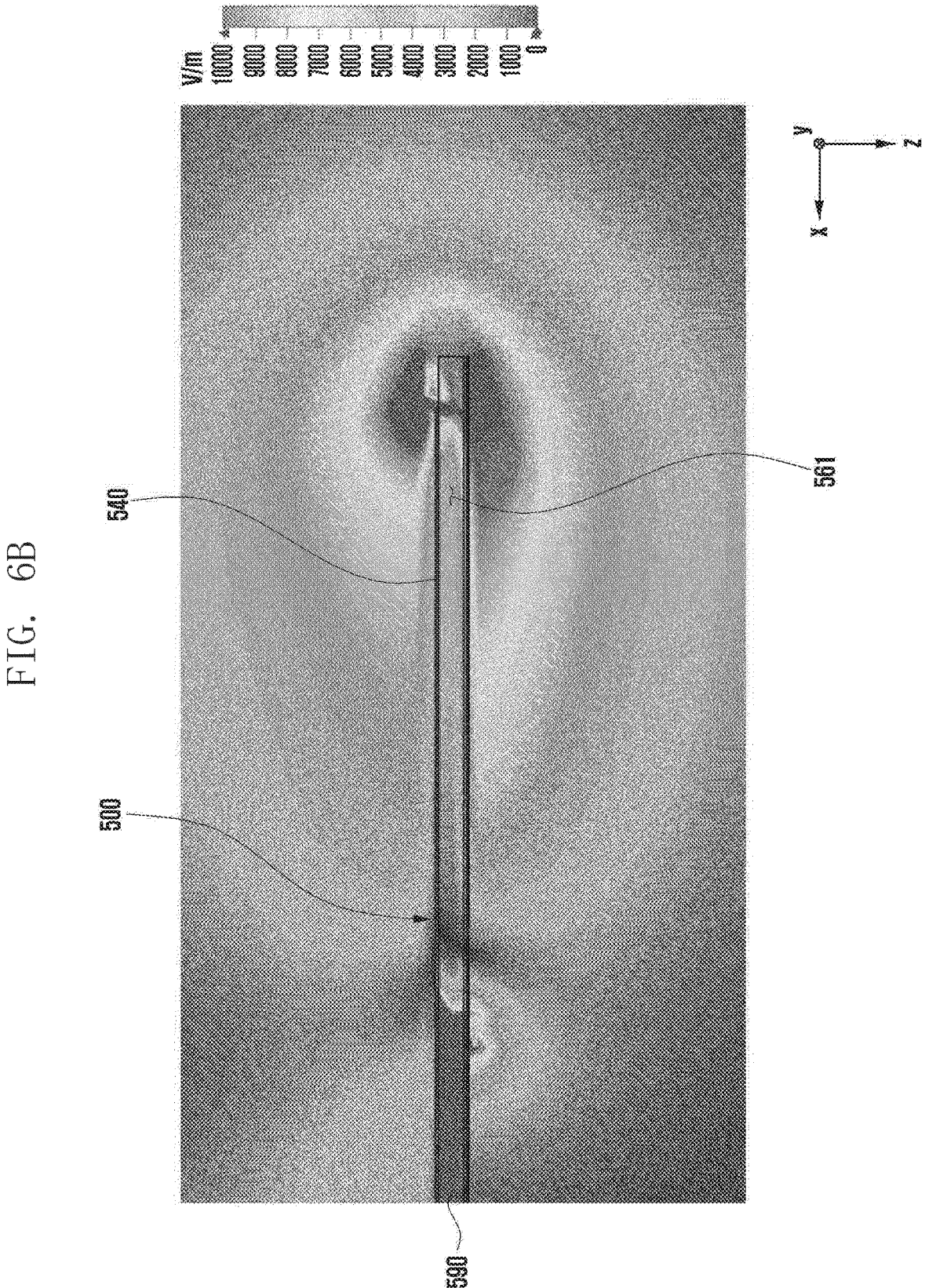

FIGS. 6A and 6B are diagrams comparing radiation performances of second antennas depending on the presence or absence of a non-conductive area according to various embodiments of the disclosure.

FIGS. 6A and 6B are diagrams comparing field distributions (e.g., electric field distributions (heat maps)) in the vertical direction (e.g., the ±z-axis direction) of the first antenna A1 using the plurality of first conductive patches 510, 520, and 530 and the second antenna A2 using the second conductive patch 540 depending on the presence or absence of the non-conductive area 561.

In the case of the comparative example in which the non-conductive area 561 of FIG. 6A is absent, it may be seen that most of the fields of the first antenna A1 and the second antenna A2 are generated between the conductive patches 510, 520, 530, and 540 and the ground layer G, and almost no field is generated on the rear side the ground layer G (e.g., in the z-axis direction). This may mean that, in a low-height dielectric substrate 590, fields are confined in a narrower space and the performance of the antenna (especially, the second antenna) is reduced.

When the non-conductive area 561 according to the embodiment of the disclosure in FIG. 6B is present, it may be identified that the second antenna A2 generates fields up to the rear side of the dielectric substrate 590 (e.g., in the z-axis direction). This may mean that, even when the second conductive patch 540 is placed in a narrow space between the low-height dielectric substrate 590 and the first and second sub-patches 510 and 520, the performance of the second antenna A2 can be improved.

Figure 7A:
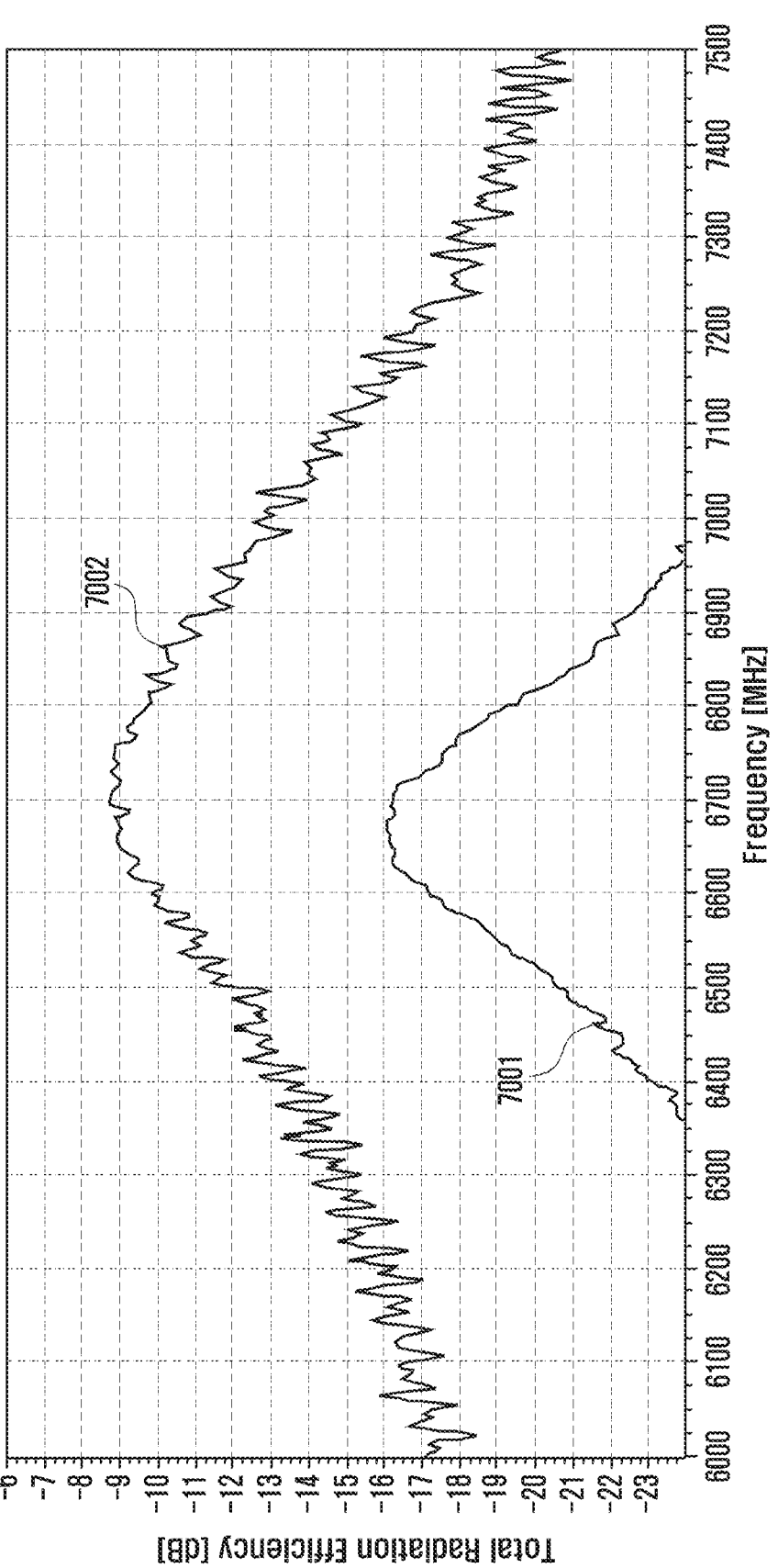
FIGS. 7A and 7B are diagrams illustrating graphs showing radiation performances of second antennas depending on the presence or absence of a non-conductive area according to various embodiments of the disclosure.
Figure 7B:
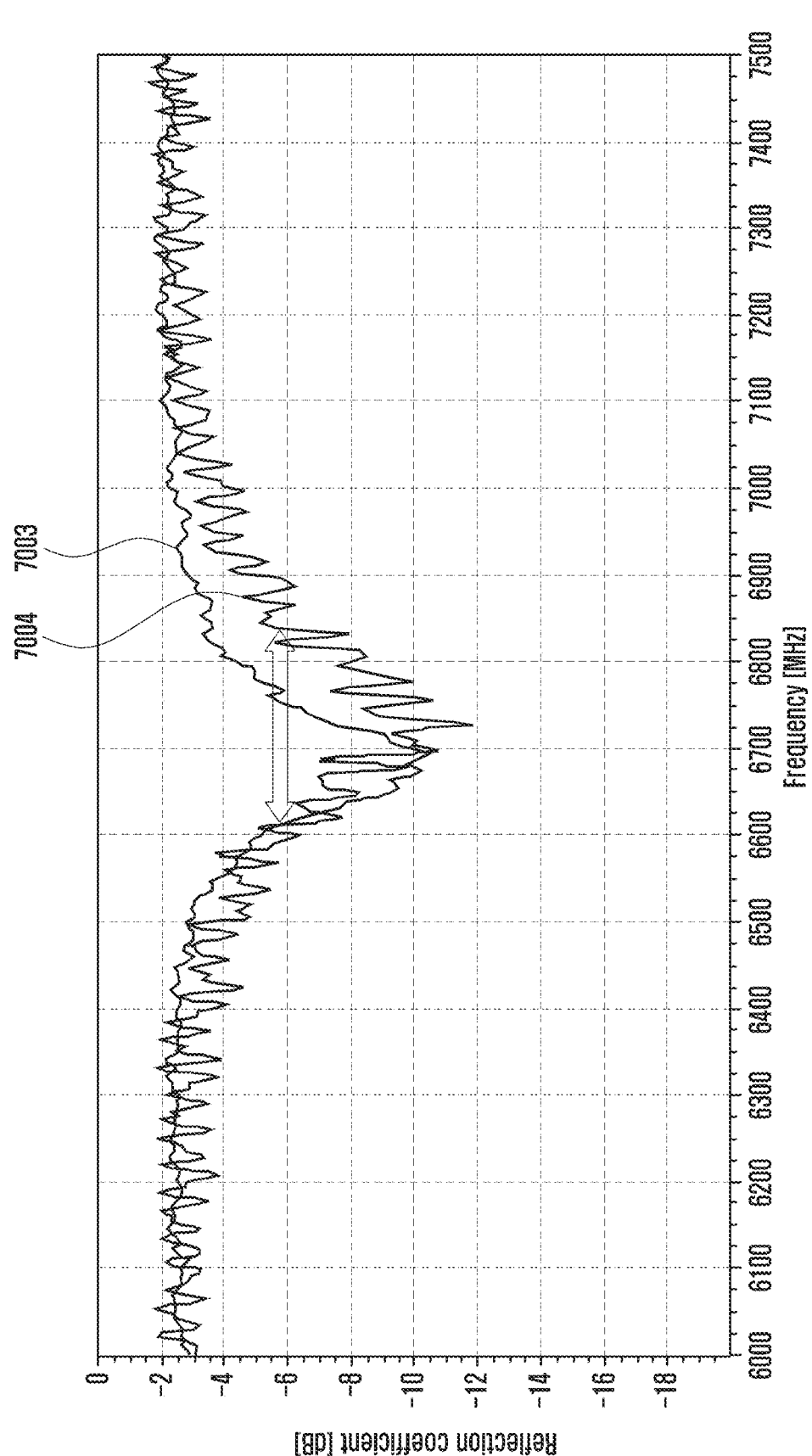

FIGS. 7A and 7B are graphs showing radiation performances of second antennas depending on the presence or absence of a non-conductive area according to various embodiments of the disclosure.

Referring to FIG. 7A, it may be identified that, in the second frequency band (e.g., about 6.7 GHz), when the non-conductive area 561 is disposed (e.g., graph 7002), the efficiency of the second antenna A2 is improved by about 7 dB or more compared to when the non-conductive area 561 is not disposed (e.g., graph 7001).

Referring to FIG. 7A, in the second frequency band (e.g., about 6.7 GHz), it may be identified that, with reference to −6 dB at which the second antenna A2 is operable, when the non-conductive area 561 is disposed (e.g., graph 7004), the bandwidth of the second antenna A2 is relatively expanded compared to when the non-conductive area 561 is not disposed (e.g., graph 7003).

This may mean that, in the corresponding operating frequency band (e.g., the second frequency band), the radiation performance of the second antenna A2 including the second conductive patch 540 disposed to overlap the non-conductive area 561 is relatively improved compared to the comparative example.

Moreover, Table 1 below shows the results obtained by comparing performance changes (e.g., TIS) of the first antenna A1 using the plurality of first conductive patches 510, 520, and 530 in the case where, as the radiation performance of the second antenna A2 using the second conductive patch 540 is improved through the non-conductive area 561, the second antenna A2 operates with diversity with a peripheral antenna (e.g., the third antenna A3 in FIG. 2B) or operates alone.

TABLE 1

| TIS (dBm) | $1^{st}$ sub-patch | $2^{nd}$ sub-patch | $3^{rd}$ sub-patch | $2^{nd}$ conductive patch |
|---|---|---|---|---|
| Comparative Example | −87.4 | −90.4 | −86.9 | — |
| The disclosure | −87.0 | −90.2 | −87.3 | −83.9 |

As shown in Table 1, in the case of the comparative example in which the non-conductive area 561 and the second conductive patch 540 are not present, the first antenna A1 may have a reception sensitivity of about −90.4 dBm to −86.9 dBm. In an embodiment, it may be seen that, when the non-conductive area 561 of the disclosure and the second conductive patch 540 overlapping therewith exist, the second antenna A2 exhibits a reception sensitivity of about −83.9 dBm, and the first antenna A1 has a reception sensitivity of about −90.2 dBm to −87.0 dBm, maintaining the same level as the comparative example. This may mean that, even when the second antenna A2 in which the second conductive patch 540 is disposed to overlap the non-conductive area 561 between the plurality of first conductive patches 510 and 520 is used according to an embodiment of the disclosure, the radiation performance of the first antenna A1 using the plurality of first conductive patches 510, 520, and 530 is not deteriorated.

Figure 8:
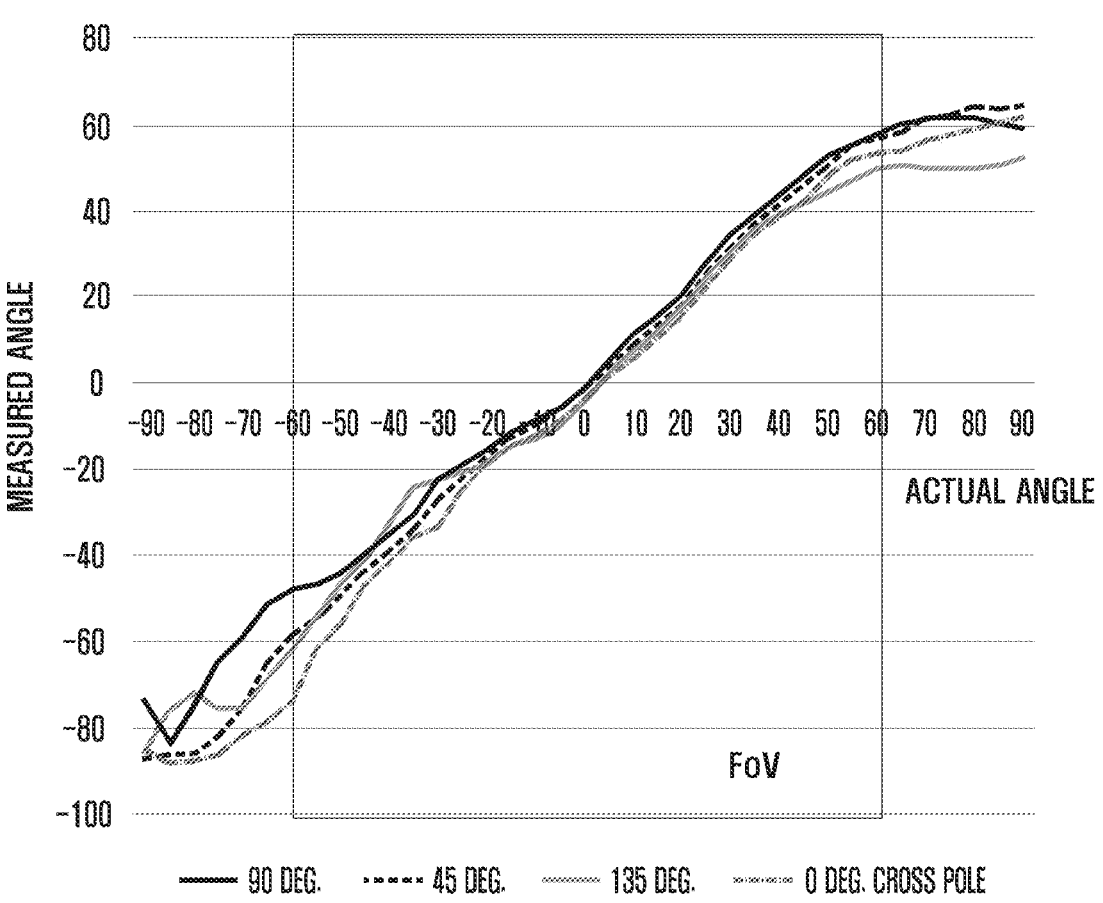
FIG. 8 is a diagram illustrating graphs comparing the performances of the first antenna depending on the rotation of a counterpart terminal according to an embodiment of the disclosure.

FIG. 8 shows graphs comparing the performances of the first antenna depending on the rotation of a counterpart terminal according to an embodiment of the disclosure.

Referring to FIG. 8, it may be seen that when the plurality of first conductive patches 510, 520, and 530 as the first antenna A1 operate as a circular polarization (CP) antenna to receive a wireless signal, and the second antenna A2 operates alone or with diversity with a peripheral antenna (e.g., the third antenna A3 in FIG. 2B), a constant AoA performance result is always obtained depending on the various rotation angles (e.g., 90 degrees, 45 degrees, 135 degrees, or 0 degrees) of the counterpart terminal.

Figure 9:
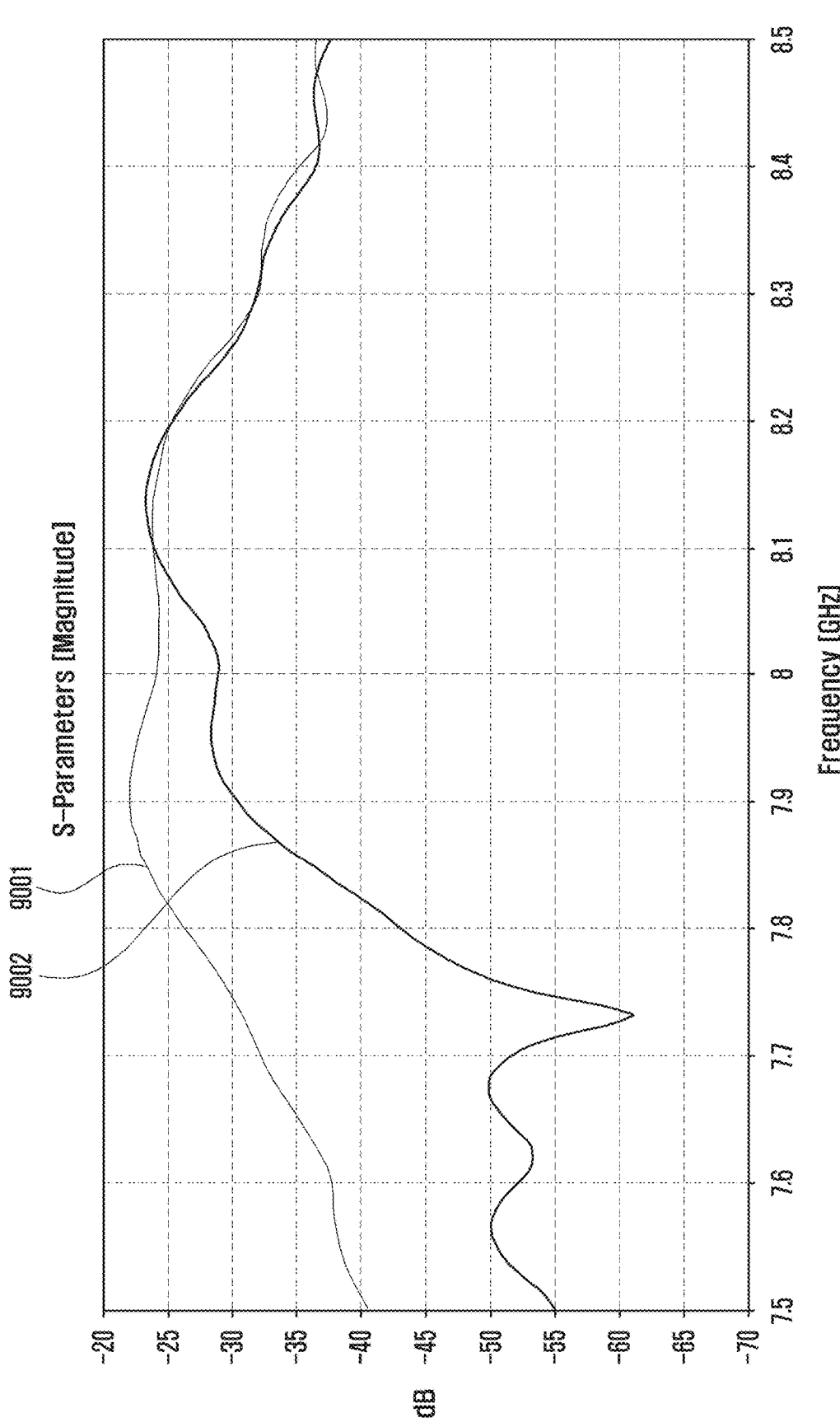
FIG. 9 is a diagram illustrating graphs comparing the isolations of the first sub-patch and the second sub-patch depending on the presence or absence of a non-conductive area according to an embodiment of the disclosure.

FIG. 9 shows graphs comparing the isolations of the first sub-patch and the second sub-patch depending on the presence or absence of a non-conductive area according to an embodiment of the disclosure.

Referring to FIG. 9, it may be identified that, when the second length L2 of the non-conductive area 561 disposed to overlap the second conductive patch 540 is λ/4 or more with reference to the first frequency band of the first antenna A1 (e.g., the frequency band in the range of about 7.75 GHz to 8.25 GHz (e.g., Ch 9)), the isolation between two sub-patches 510 and 520 is improved when the non-conductive area 561 is present (e.g., graph 9002) compared to when the non-conductive area 561 is absent (e.g., graph 9001). This may mean that, when the non-conductive area 561 has the second length L2 of λ/4 or more with reference to the first frequency band of the first antenna A1, the non-conductive area may be used as a band stop filter for the first sub-patch 510 and the second sub-patch 520 of the first antenna A1.

Figure 10:
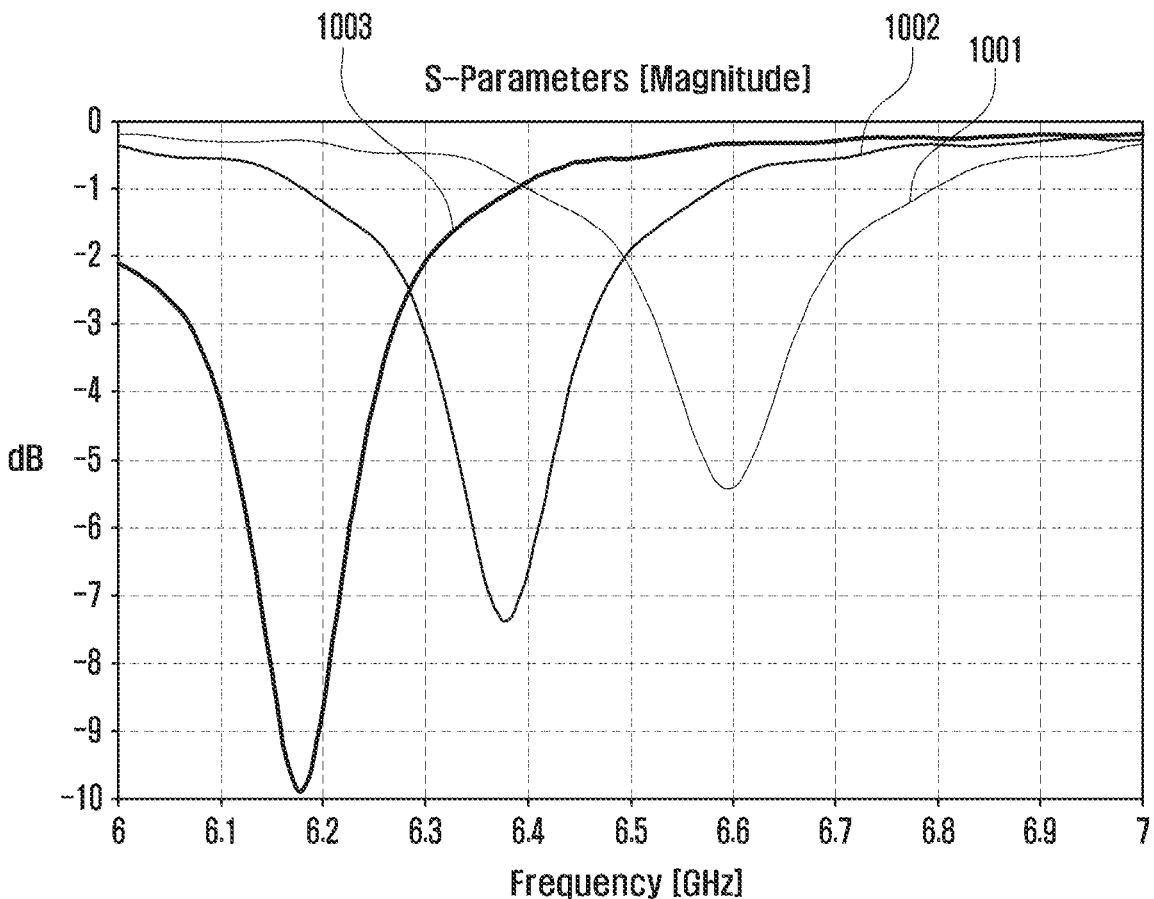
FIG. 10 is a diagram illustrating graphs comparing the radiation performances of the second antennas depending on the second length of the non-conductive area according to an embodiment of the disclosure.

FIG. 10 illustrates graphs comparing the radiation performances of the second antennas depending on the second length of the non-conductive area according to an embodiment of the disclosure.

Referring to FIG. 10, it may be known that, when the non-conductive area 561 is absent (e.g., Graph 1001 graph), the second antenna A2 operates in the band of about 6.6 GHz, when the second length L2 of the non-conductive area 561 is about 3 mm (e.g., Graph 1002), the operating frequency band of the second antenna A2 is low-shifted to the band of about 6.38 GHz, and when the second length of the non-conductive area 561 is about 6 mm (e.g., Graph 1003), the operating frequency band of the second antenna A2 is low-shifted to the band of about 6.18 GHz. This may mean that the second length L2 of the non-conductive area 561 can be used as a resonance element based on which the resonance frequency of the second antenna A2 can be determined. In some embodiments, the first length L1 of the non-conductive area 561 may also be used as a resonance element based on which the resonance frequency of the second antenna A2 can be determined.

Figure 11:
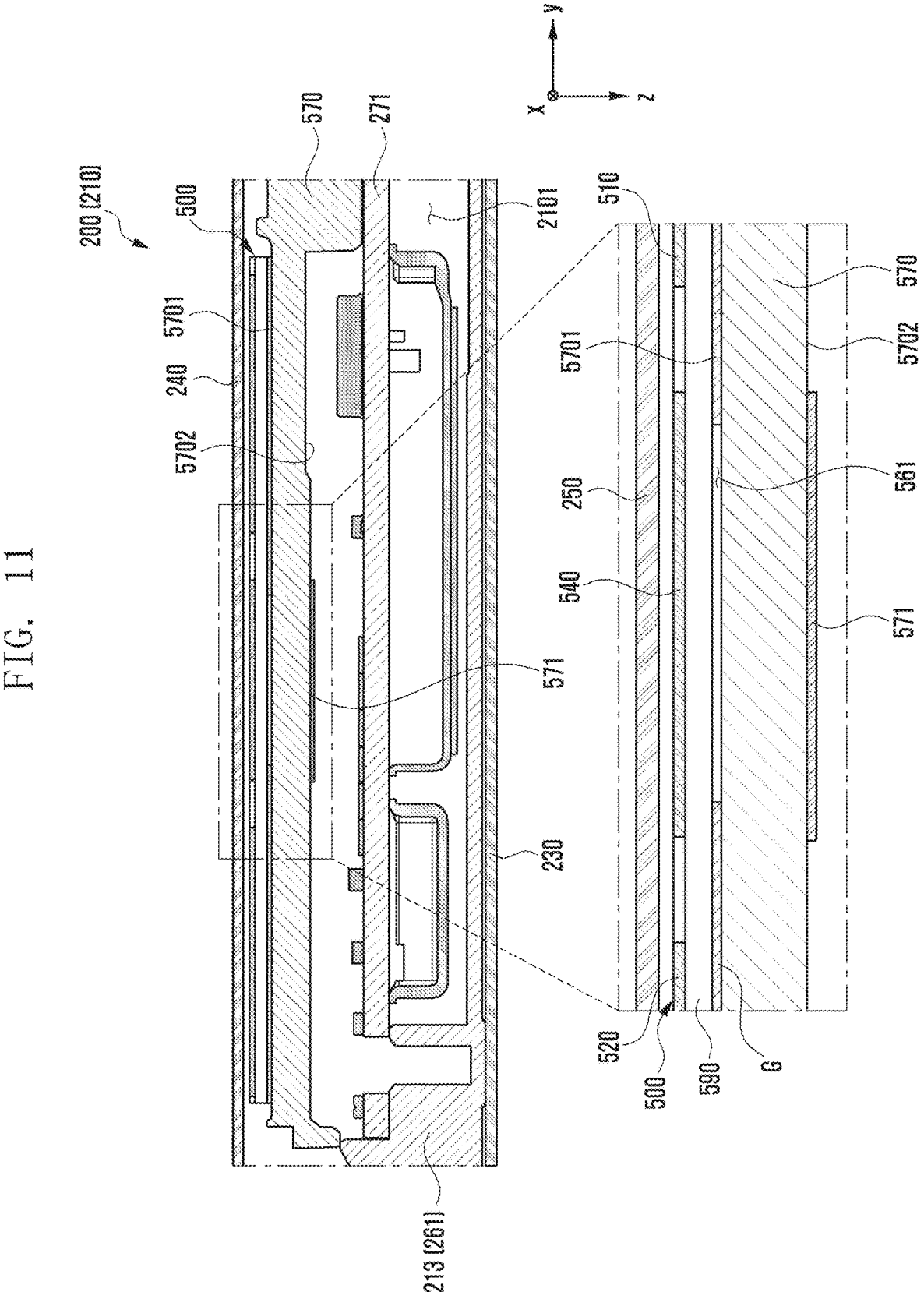
FIG. 11 is a partial cross-sectional view of an electronic device viewed along line 11-11 of FIG. 2B according to an embodiment of the disclosure.

FIG. 11 is a partial cross-sectional view of an electronic device viewed along line 11-11 of FIG. 2B according to an embodiment of the disclosure.

Referring to FIG. 11, an electronic device 200 may include a first housing 210, a second housing (e.g., the second housing 220 in FIG. 2B), one or more hinge modules coupling the first and the second housings 210 and 220 to be rotatable relative to each other (e.g., the hinge modules 400, 400-1, and 400-2 in FIG. 4), and a flexible display 230 disposed to be supported by the first housing 210 and the second housing 220. In an embodiment, the electronic device 200 may include an antenna structure 500 disposed through an antenna carrier 570 (e.g., an injection-molded product or a dielectric carrier) in a first space 2101 of the first housing 210. In an embodiment, the antenna carrier 570 may be disposed to be supported by a first support member 261 extending from a first side surface member 213 to the first space 2101. In an embodiment, the antenna structure 500 may be electrically connected to a first substrate 271 (e.g., a main printed circuit board) disposed between the antenna carrier 570 and the first support member 261 in the first space 2101 of the first housing 210. In an embodiment, the flexible display 230 may be disposed to be supported by the first support member 261.

According to various embodiments, the antenna carrier 570 may include a first surface 5701 facing a first rear surface cover 240 and a second surface 5702 facing away from the first surface 5701. In an embodiment, the antenna structure 500 may be disposed on the first surface 5701 between the first side 5701 and the first rear surface cover 240. In an embodiment, the antenna structure 500 may be disposed on the antenna carrier 570 to transmit or receive wireless signals in a direction in which the first rear surface cover 240 is oriented (e.g., the −z-axis direction), via the plurality of first conductive patches 510 and 520 and the second conductive patch 540.

According to various embodiments, the antenna structure 500 may include a second conductive patch 540 disposed between the first sub-patch 510 and the second sub-patch 520 on a dielectric substrate 590. In an embodiment, the antenna structure 500 may include a non-conductive area 561 disposed in at least a partial area overlapping the second conductive patch 540 when the first surface 5701 is viewed from above. In an embodiment, the non-conductive area 561 may be provided by removing or omitting a ground layer G disposed on the dielectric substrate 590. In an embodiment, the second conductive patch 540 of the antenna structure 500 may be deteriorated in performance due to the influence of surrounding electronic components due to the non-conductive region 561 located on the lower side (e.g., the −z-axis direction). In an embodiment, in order to reduce this performance degradation, the electronic device 200 may include a shielding member 571 disposed at a position that overlaps at least the non-conductive area 561 and overlaps the non-conductive area 561 when the first surface 5701 is viewed from above. In an embodiment, the shielding member 571 is made of a conductive material, and may be disposed on the second surface 5702 of the antenna carrier 570. In an embodiment, the shielding member 571 may include at least one of a conductive plate, a conductive pattern, or a conductive paint disposed on the second surface 5702. In some embodiments, the shielding member 571 may be embedded between the first surface 5701 and the second surface 5702 through injection molding.

Figure 12A:
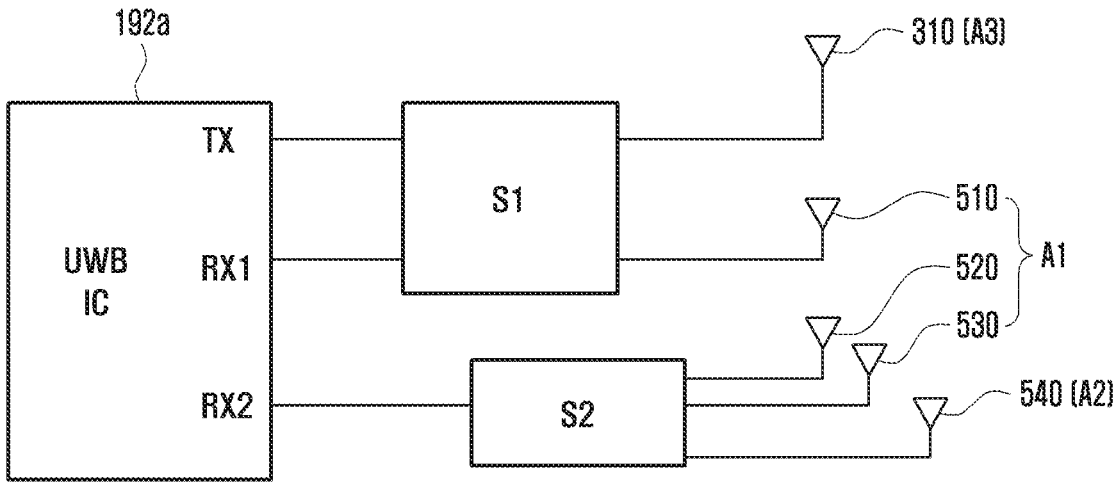
FIGS. 12A and 12B are diagrams schematically illustrating operation scenarios of an electronic device according to various embodiments of the disclosure.
Figure 12B:
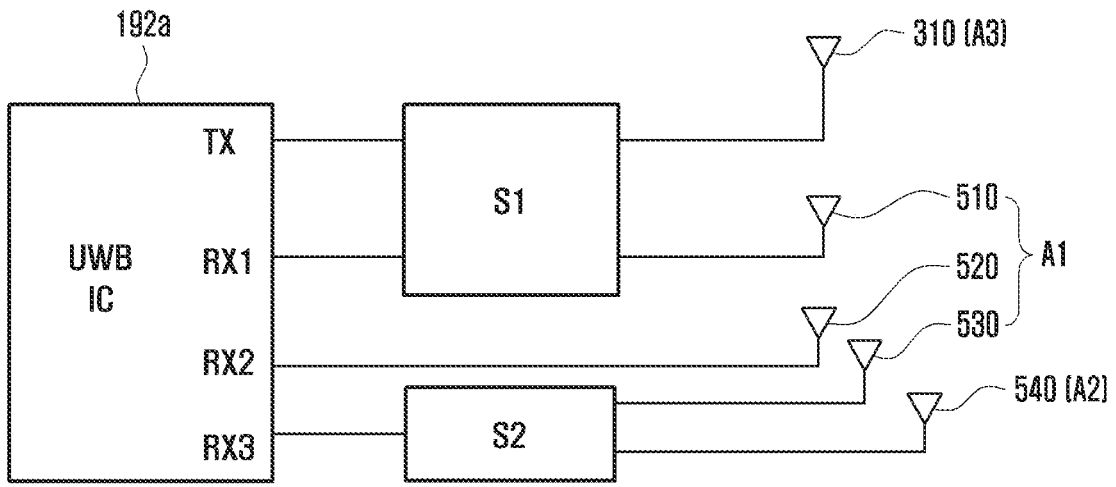

FIGS. 12A and 12B are views schematically illustrating operation scenarios of an electronic device according to various embodiments of the disclosure.

According to various embodiments, as illustrated in FIG. 2B, the electronic device 200 may include a conductive portion 310 disposed on the conductive first side surface member 213 via a pair of split portions 311 and 312 and used as a third antenna (e.g., a metal bezel antenna). In an embodiment, a wireless communication circuit 192a (e.g., the wireless communication module 192 in FIG. 1) may be configured to transmit or receive wireless signals in the first frequency band (e.g., Ch 9) and/or the second frequency band (e.g., Ch 5) via the conductive portion 310.

Referring to FIG. 12A, the electronic device 200 may be configured to operate in a 2Rx specification through the plurality of first conductive patches 510, 520, and 530, the second conductive patch 540, and the conductive portion 310. For example, the wireless communication circuit 192a (e.g., the wireless communication module 192 in FIG. 1) may be configured to be connected to at least one of the conductive portion 310 or the first sub-patch 510 at one Tx terminal via a first switching circuit S1 (a first switching device or first switch) (e.g., a double-pole double-throw (DPDT) switch). In an embodiment, the wireless communication circuit 192a may be configured to be electrically connected to at least one of the conductive portion 310 or the first sub-patch 510 at the Rx1 terminal via the first switching circuit S1. In an embodiment, the wireless communication circuit 192a is configured to be electrically connected to at least one of the second sub-patch 520, the third sub-patch 530, or the second conductive patch 540 at the Rx2 terminal via a second switching circuit S2 (e.g., a second switching device or second switch) (e.g., a single-pole 4-throw (SP4T) switch). In an embodiment, the first switching circuit S1 and/or the second switching circuit S2 may be configured to be controlled via a processor (e.g., the processor 120 of FIG. 1) or a wireless communication circuit 192a (e.g., the wireless communication module 192 in FIG. 1) of the electronic device 200.

According to various embodiments, the wireless communication circuit 192a may be configured to connect the Rx1 terminal to the first sub-patch 510 and connect the Rx2 terminal to the second sub-patch 520 or the third sub-patch 540 in the first frequency band (e.g., Ch 9) to compare the phases of received wireless signals based on 2Rx (angle of arrival (AoA) operation). In an embodiment, the wireless communication circuit 192a may be configured to operate with diversity by connecting the Rx1 terminal to the conductive portion 310 and connecting the Rx2 terminal to the second conductive patch 540 in the second frequency band (e.g., Ch 5).

Referring to FIG. 12B, the electronic device 200 may be configured to operate in a 3Rx specification through the plurality of first conductive patches 510, 520, and 530, the second conductive patch 540, and the conductive portion 310. For example, the wireless communication circuit 192a (e.g., the wireless communication module 192 in FIG. 1) may be configured to be electrically connected to at least one of the conductive portion 310 or the first sub-patch 510 at one Tx terminal via a first switching circuit S1 (a first switching device or first switch) (e.g., a double-pole double-throw (DPDT) switch). In an embodiment, the wireless communication circuit 192a may be configured to be electrically connected to at least one of the conductive portion 310 or the first sub-patch 510 at the Rx1 terminal via the first switching circuit S1. In an embodiment, the wireless communication circuit 192a may be configured such that the Rx2 terminal is connected to the second sub-patch 520. In an embodiment, the wireless communication circuit 192a is configured to be electrically connected to at least one of the third sub-patch 530 or the second conductive patch 540 at the Rx3 terminal via a second switching circuit (S2) (e.g., a second switching device or second switch) (e.g., a single pole double throw (SPDT) switch). In an embodiment, the first switching circuit S1 and/or the second switching circuit S2 may be configured to be controlled via a processor (e.g., the processor 120 of FIG. 1) or a wireless communication circuit 192a (e.g., the wireless communication module 192 in FIG. 1) of the electronic device 200.

According to various embodiments, the wireless communication circuit 192a may be configured to connect the Rx1 terminal to the first sub-patch 510 and connect the Rx3 terminal to the third sub-patch 530 in the first frequency band (e.g., Ch 9) to compare the phases of received wireless signals based on 3Rx (angle of arrival (AoA) operation). In an embodiment, the wireless communication circuit 192a may be configured to operate in diversity by connecting the Rx1 terminal to the conductive portion 310 and connecting the Rx3 terminal to the second conductive patch 540 in the second frequency band (e.g., Ch 5).

Figure 13:
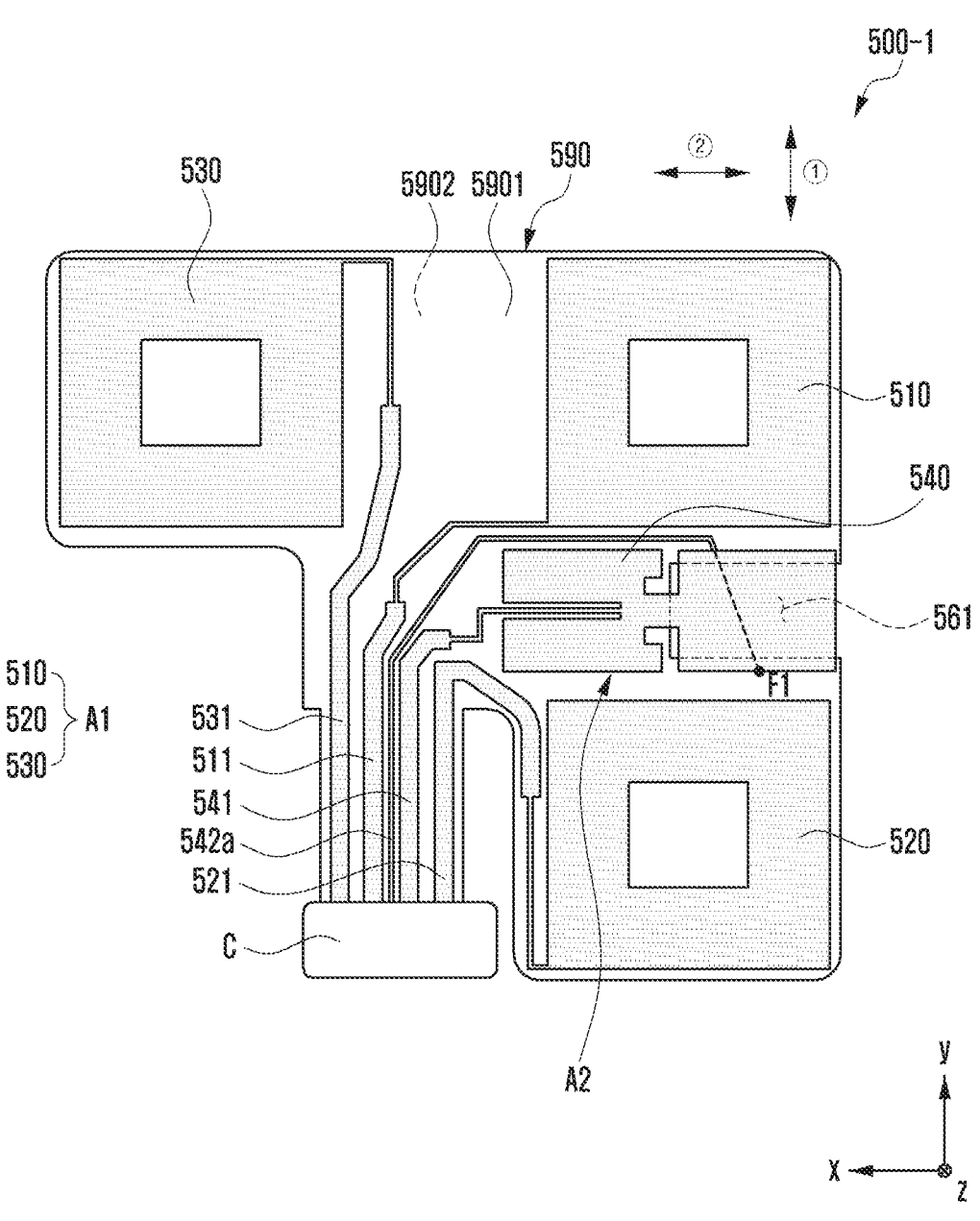
FIG. 13 is a view illustrating the configuration of an antenna structure according to an embodiment of the disclosure.

FIG. 13 is a view illustrating the configuration of the antenna structure according to an embodiment of the disclosure.

In describing the antenna structure 500-1 of FIG. 13, the same reference numerals are assigned to the components substantially the same as those of the antenna structure 500 of FIG. 5A, and a detailed description thereof may be omitted.

Referring to FIG. 13, a non-conductive area 561 provided in a slot structure by removing a ground layer G may be operated as another antenna via a wireless communication circuit (e.g., the wireless communication module 192 in FIG. 1). In an embodiment, the antenna structure 500-1 may include a feeder F1 electrically connected to at least a portion of the ground layer G by extending from a connector C in a dielectric substrate 590 via a fifth wire 542a (e.g., a fifth electrical path or fifth wiring structure) and crossing the slot in a non-conductive area 561. In an embodiment, the feeder F1 may be electrically connected to a wireless communication circuit (e.g., the wireless communication module 192 in FIG. 1) disposed on a first substrate (e.g., the first substrate 271 in FIG. 4) of a first housing (e.g., the first housing 210 in FIG. 4) via the fifth wire 542*a* and the connector C. In an embodiment, the wireless communication circuit (e.g., the wireless communication module 192 in FIG. 1) may be operated as a slot antenna configured to transmit or receive wireless signals in a third frequency band via the feeder F1 of the fifth wire 542*a* extending across the slot in the non-conductive area 561 and electrically connected to the ground layer G around the non-conductive area 561. In this case, the third frequency band may be substantially the same as at least one of the first and second frequency bands, or may include different frequency bands.

Figure 14A:
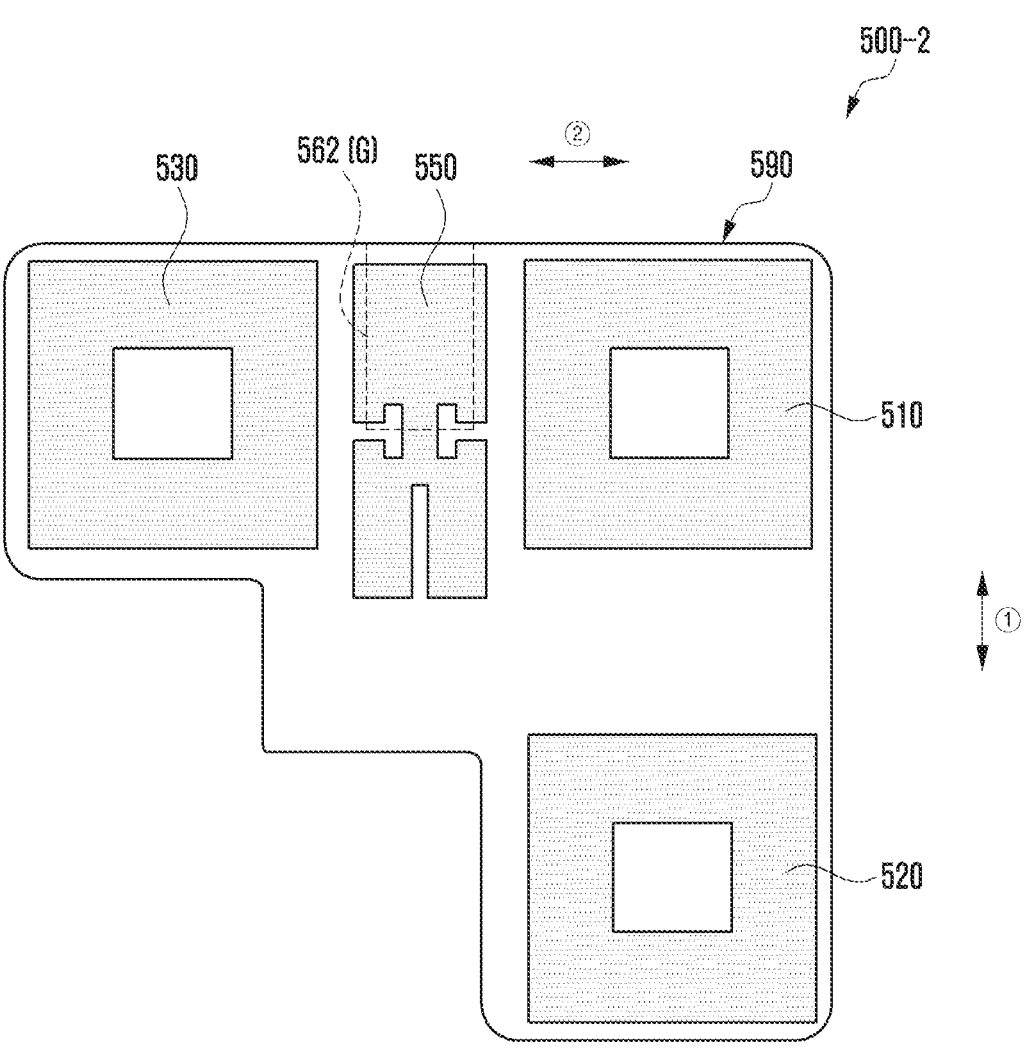
FIGS. 14A and 14B are views illustrating the configurations of antenna structures according to various embodiments of the disclosure.
Figure 14B:
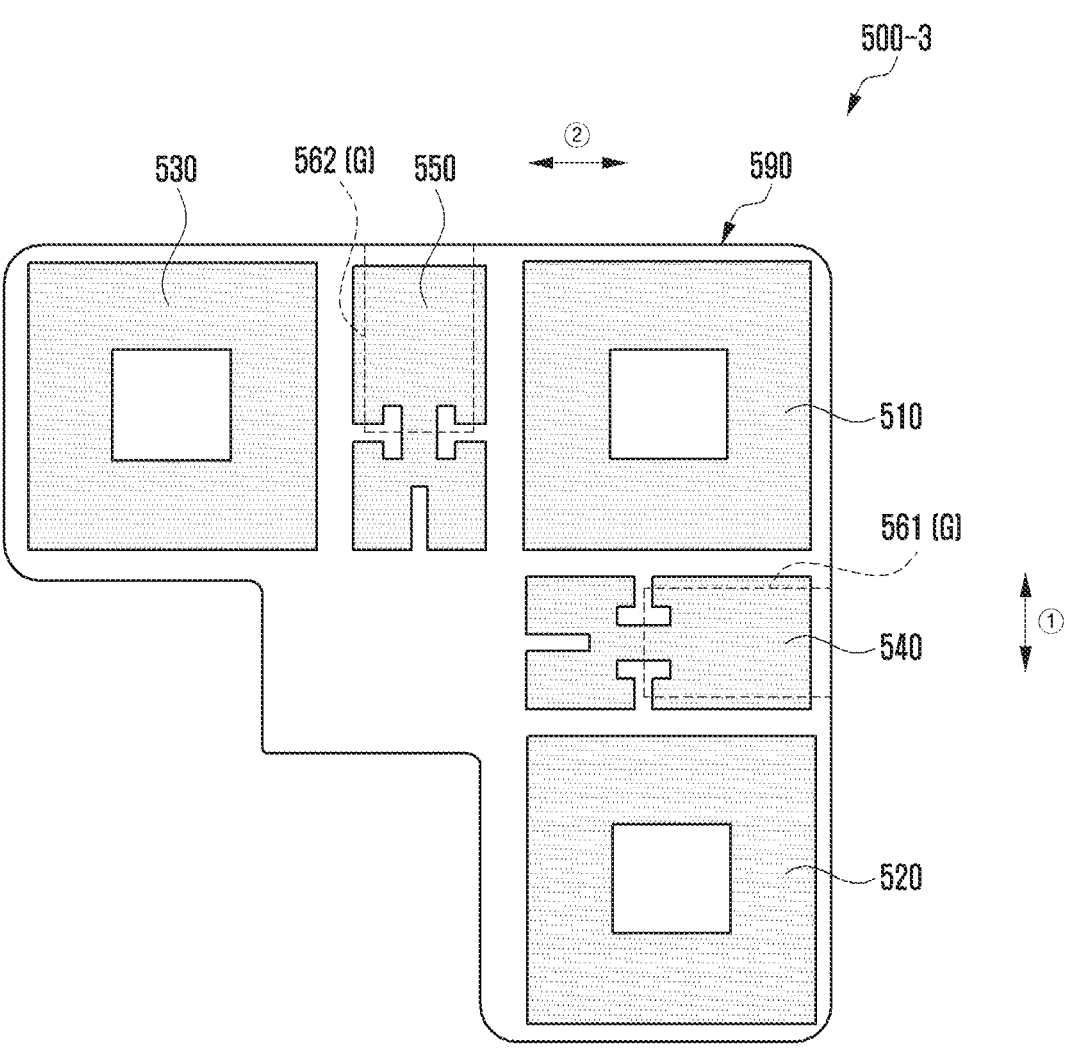

FIGS. 14A and 14B are views illustrating the configurations of antenna structures according to various embodiments of the disclosure.

In describing the antenna structures 500-2 and 500-3 of FIGS. 14A and 14B, the same reference numerals are assigned to the components substantially the same as those of the antenna structure 500 of FIG. 5A, and a detailed description thereof may be omitted.

Referring to FIG. 14A, the antenna structure 500-2 may include a third conductive patch 550 disposed between the first sub-patch 510 and the third sub-patch 530. In an embodiment, the third conductive patch 550 may have substantially the same structure as the second conductive patch 540 in FIG. 5A. In an embodiment, the antenna structure 500-2 may include a non-conductive area 562 disposed to overlap at least a portion of the third conductive patch 550 when the first substrate surface 5901 is viewed from above. In an embodiment, the third conductive patch 550 may help improve radiation performance via the non-conductive area 562 disposed below the third conductive patch 550. In an embodiment, the wireless communication circuit 192*a* (e.g., the wireless communication module 192 in FIG. 1) may be configured to transmit or receive wireless signals in the second frequency band (e.g., Ch 5) via the third conductive patch 550.

Referring to FIG. 14B, the antenna structure 500-3 may include a second conductive patch 540 disposed between the first sub-patch 510 and the second sub-patch 520 and a third conductive patch 550 disposed between the first sub-patch 510 and the third sub-patch 530. In an embodiment, when the first substrate surface 5901 is viewed from above, the antenna structure 500-3 may include a first non-conductive area 561 disposed to overlap at least a portion of the second conductive patch 540, and a second non-conductive area 562 disposed to overlap at least a portion of the third conductive patch 550. In an embodiment, the second conductive patch 540 and the third conductive patch 550 may help improve radiation performance via the first non-conductive area 561 and the second non-conductive area 562, which are disposed therebeneath (e.g., the −z-axis direction), respectively. In an embodiment, the wireless communication circuit (e.g., the wireless communication module 192 in FIG. 1) may be configured to operate in the second frequency band (e.g., Ch 5) via the second conductive patch 540 and the third conductive patch 550. In an embodiment, by being arranged in a state rotated 90 degrees with respect to each other, the second conductive patch 540 and the third conductive patch 550 may have different phases and may be used as a diversity antenna.

Figure 15A:
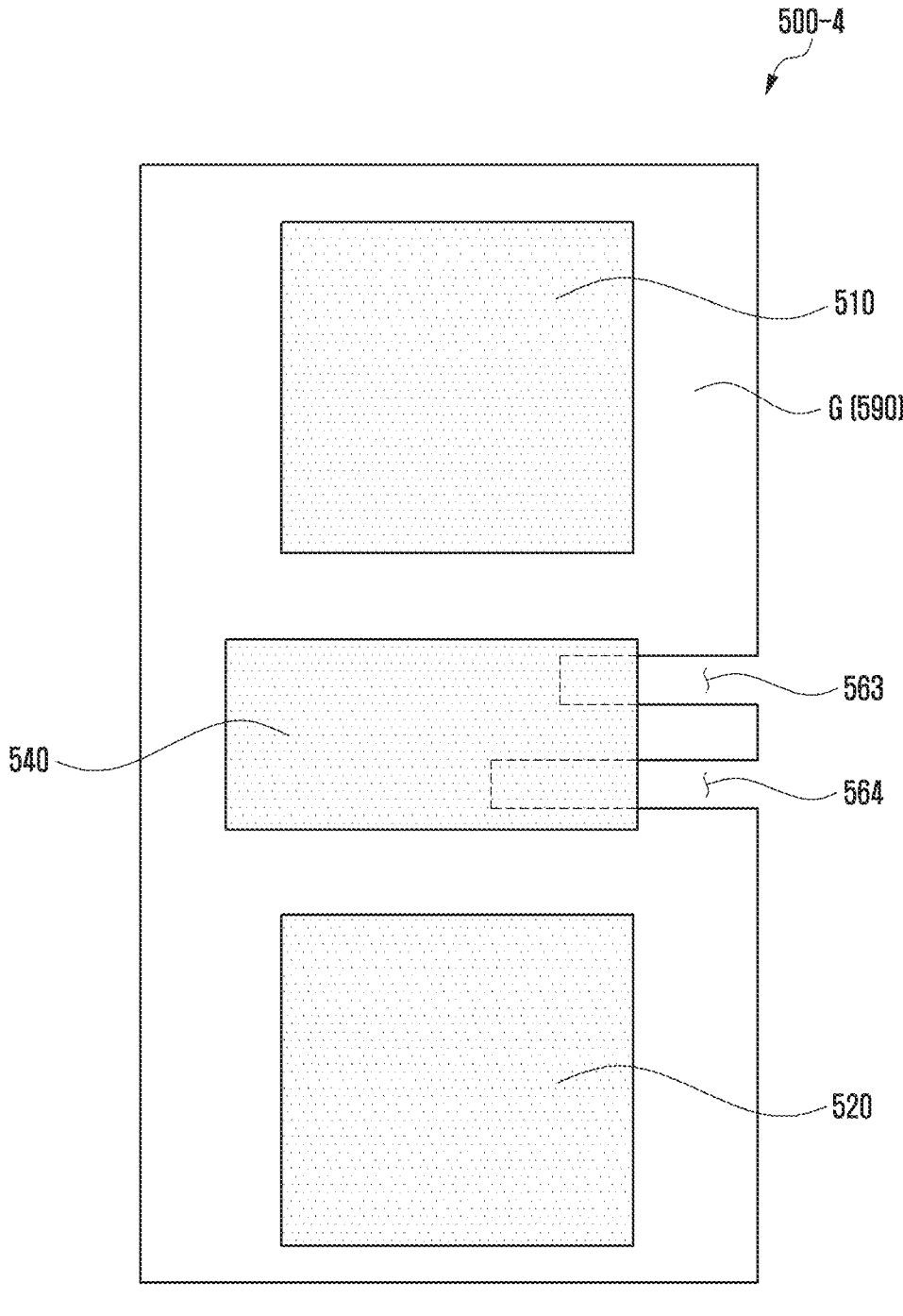
FIGS. 15A, 15B, and 15C are views illustrating the configurations of antenna structures according to various embodiments of the disclosure.
Figure 15B:
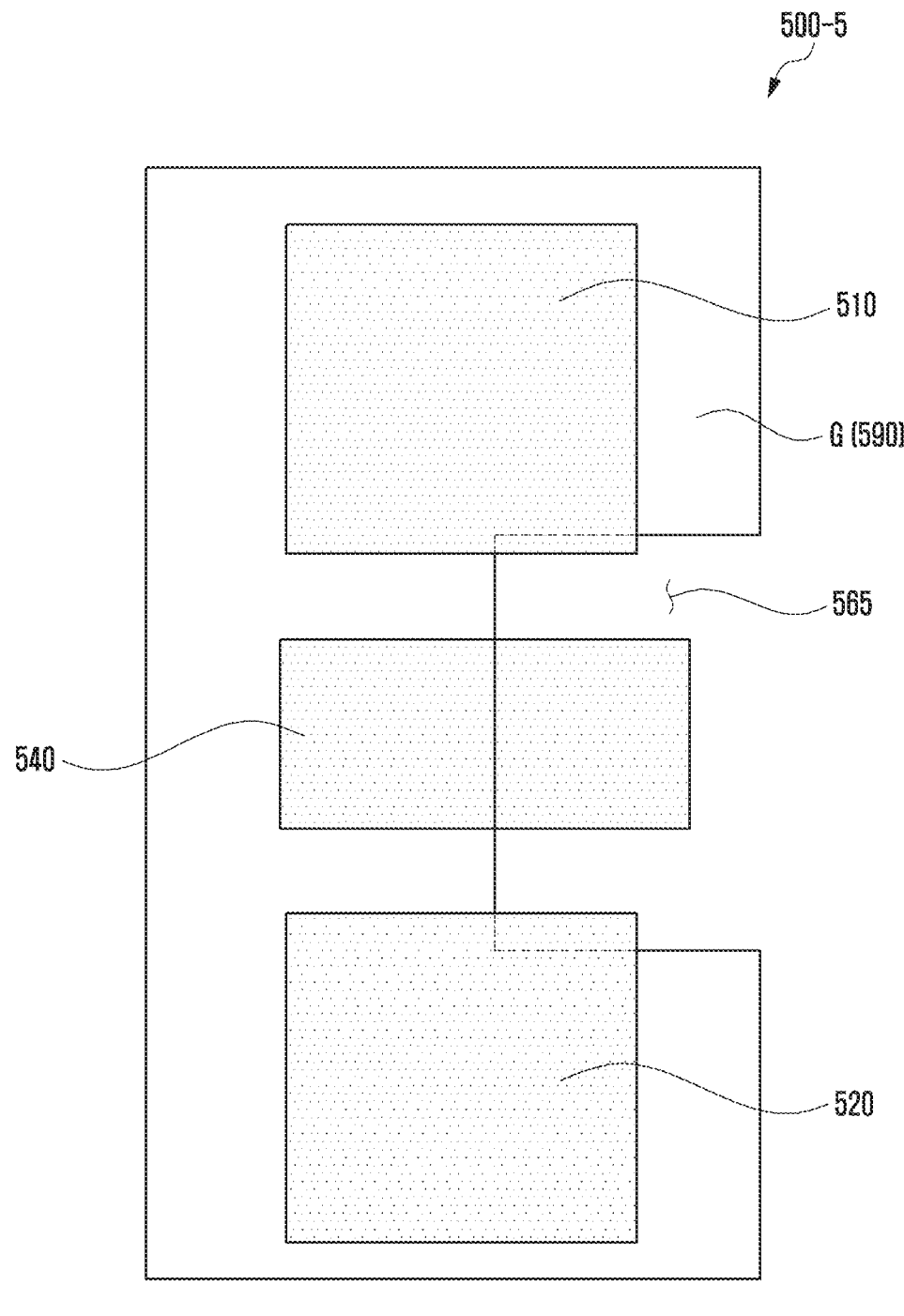
Figure 15C:
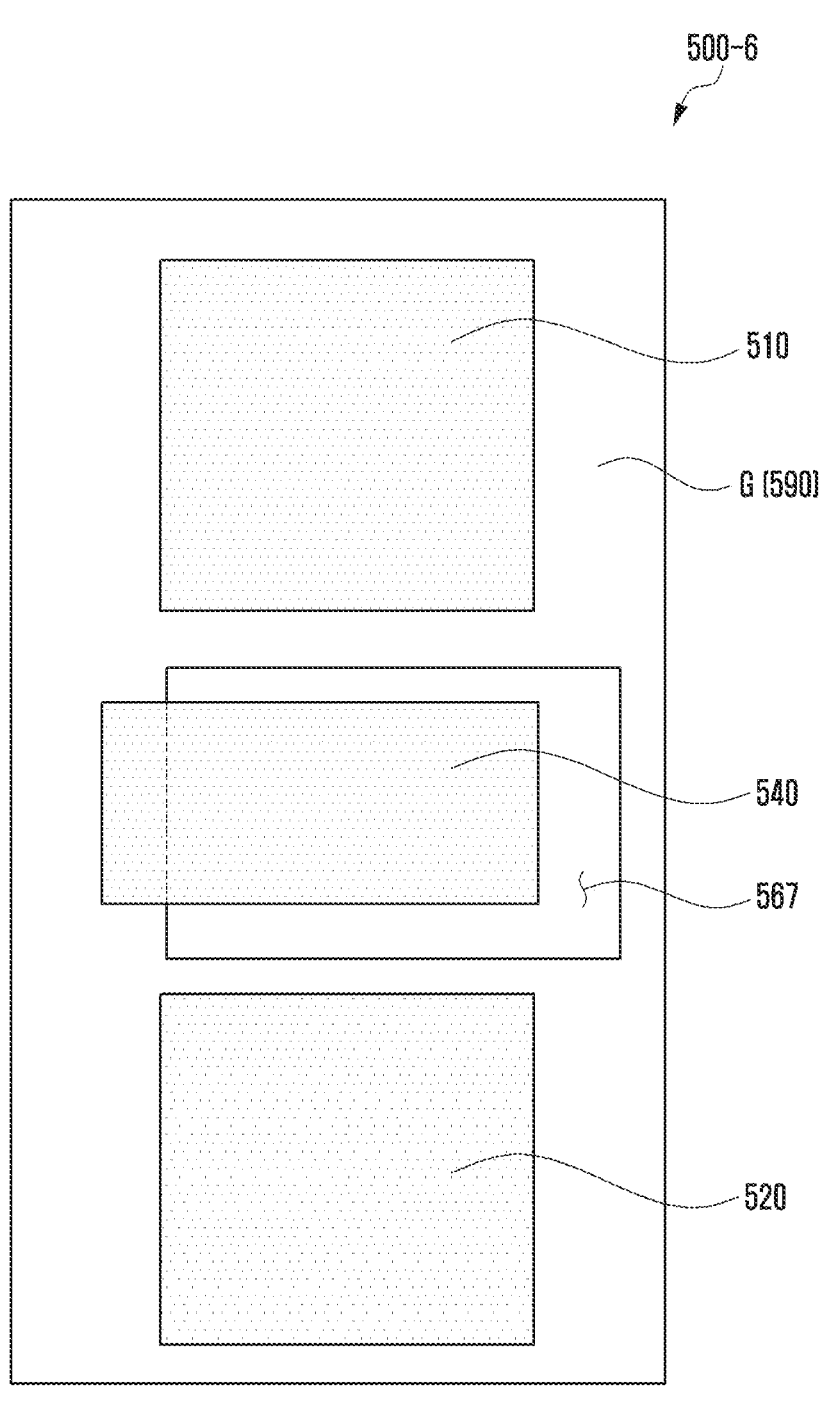

FIGS. 15A,15B, and 15C are views illustrating the configurations of antenna structures according to various embodiments of the disclosure.

In describing the antenna structures 500-4, 500-5, and 500-6 of FIGS. 15A to 15C, the same reference numerals are assigned to the components substantially the same as those of the antenna structure 500 of FIG. 5A, and a detailed description thereof may be omitted.

Referring to FIGS. 15A to 15C, the antenna structures 500-4, 500-5, and 500-6 may each include a second conductive patch 540 disposed between a first sub-patch 510 and a third sub-patch 520. In an embodiment, the antenna structures 500-4, 500-5, and 500-6 may each include a non-conductive area 563, 564, 565, or 567 of various shapes that is capable of helping improve the radiation performance of the second conductive patch 540 and/or peripheral patches (e.g., the first sub-patch 510 and the second sub-patch 520) by being disposed to overlap at least a portion of the second conductive patch 540 when the second conductive patch 540 is viewed from above.

Referring to FIG. 15A, when the second conductive patch 540 is viewed from above, the antenna structure 500-4 may include a first non-conductive area 563 overlapping at least a portion of the second conductive patch 540 and a second non-conductive area 564 overlapping at least a portion of the second conductive patch 540 and disposed on one side of the first non-conductive area 563. In an embodiment, the length of the slot in the first non-conductive area 563 and the length of the slot in the second non-conductive area 564 may differ from each other. In an embodiment, with different slot lengths, the first non-conductive area and the second non-conductive area may be used as band stop filters for low and high bands, respectively, for the first sub-patch 510 and/or the second sub-patch 520.

Referring to FIG. 15B, the antenna structure 500-5 may include a non-conductive area 565 disposed to overlap at least a portion of the second conductive patch 540 when the second conductive patch 540 is viewed from above. In an embodiment, at least a portion of the non-conductive area 565 may help improve the radiation performance of the first sub-patch 510 and/or the second sub-patch 520 by being disposed to overlap a portion of the first sub-patch 510 and/or the second sub-patch 520.

Referring to FIG. 15C, the antenna structure 500-6 may include a non-conductive area 567 disposed to overlap at least a portion of the second conductive patch 540 when the second conductive patch 540 is viewed from above. In an embodiment, the non-conductive area 567 may help reinforce the rigidity of the dielectric substrate and/or improve the radiation performance of the second conductive patch 540 by being formed in a closed opening shape in the dielectric substrate 590.

Figure 16A:
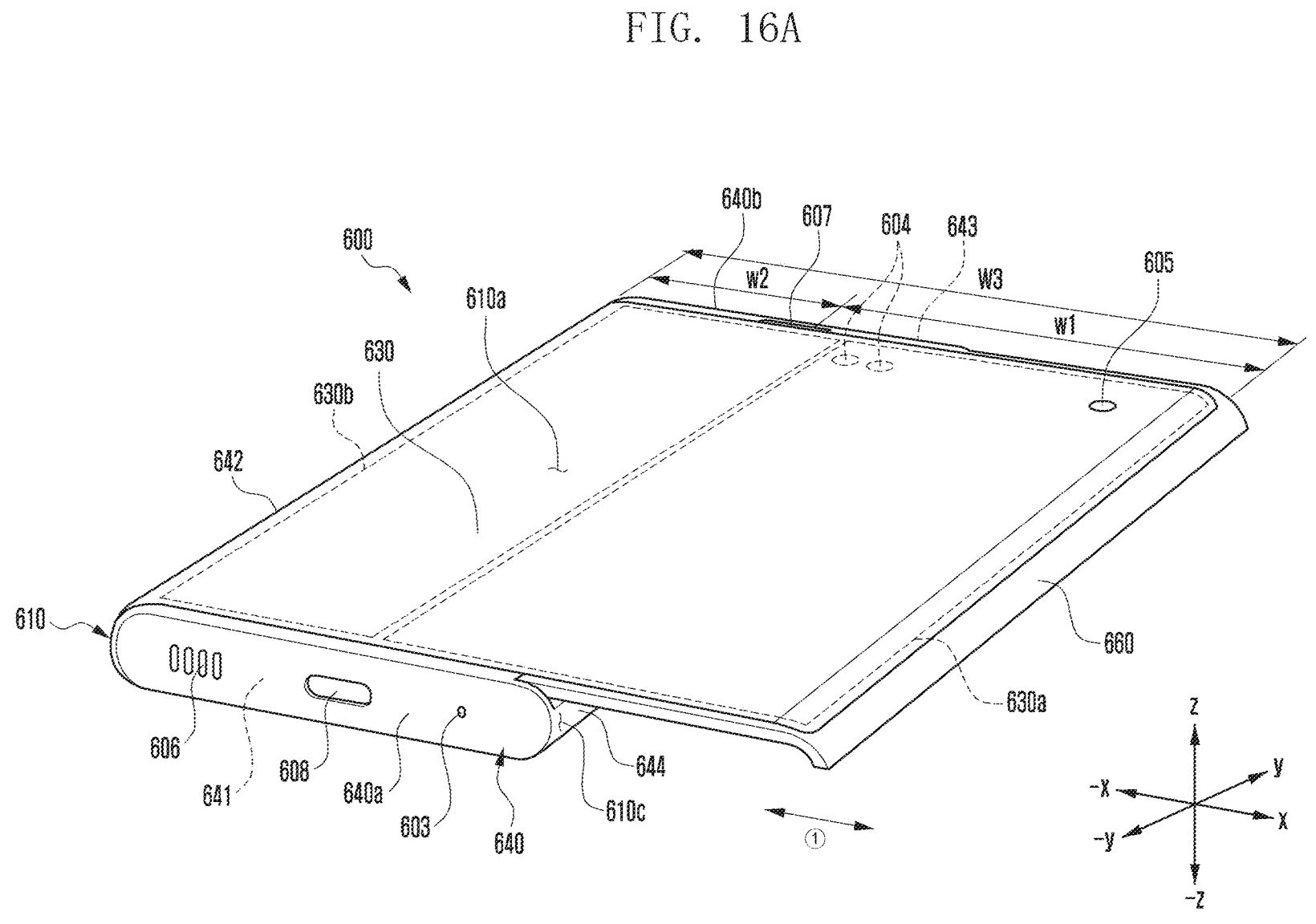
Figure 16B:
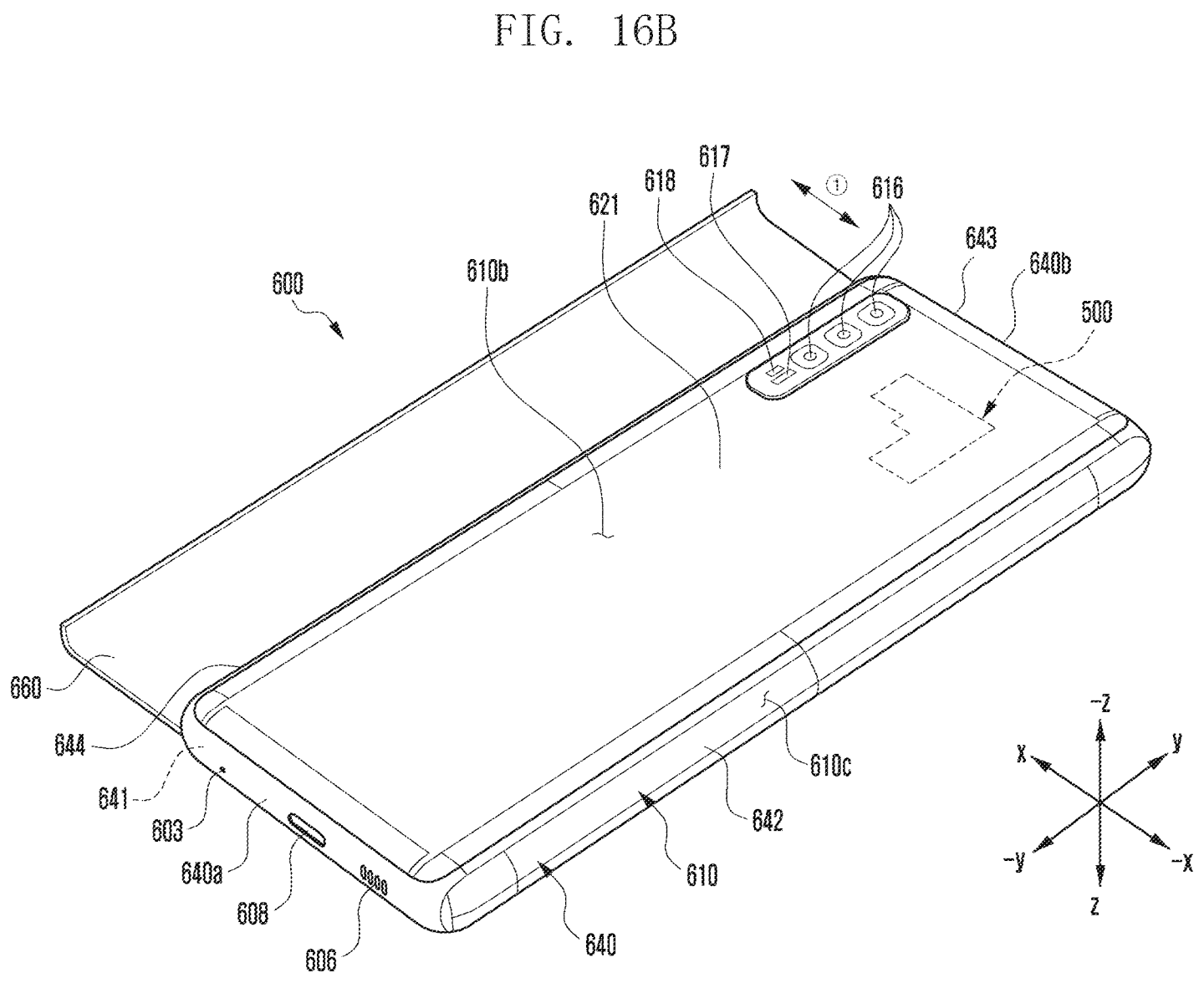

FIG. 16A is a front perspective view illustrating an electronic device according to an embodiment of the disclosure. FIG. 16B is a rear perspective view of the electronic device according to an embodiment of the disclosure.

Referring to FIGS. 16A and 16B, an electronic device 600 may include a housing 610 (e.g., a first housing or base housing), and a slide structure 660 (e.g., a second housing or slide housing) coupled to be at least partially movable from the housing 610 and configured to support at least a portion of a flexible display 630. In an embodiment, the slide structure 660 may include a bendable member (not illustrated) (e.g., an articulated hinge or a multi-bar assembly) coupled to one end thereof and configured to support at least a portion of the flexible display 630. For example, when the slide structure 660 performs a sliding operation in the housing 610, the bendable member may be at least partially slid into the inner space of the housing 610 while supporting the flexible display 630. In an embodiment, the electronic device 600 may include a housing 610 (e.g., a housing structure) having a front surface 610*a* oriented in a first direction (e.g., the Z-axis direction), a rear surface 610*b* oriented in a second direction (e.g., the −Z-axis direction) opposite to the first direction, and a side surface 610*c* surrounding the space between the front surface 610*a* and the rear surface 610*b* and at least partially exposed to the outside, and including a side surface member 640. In an embodiment, the rear surface 610*b* may be defined by a rear surface cover 621 coupled to the housing 610. In an embodiment, the rear surface cover 621 may be made of, for example, polymer, coated or colored glass, ceramic, metal (e.g., aluminum, stainless steel (STS), or magnesium), or a combination of two or more of these materials. In some embodiments, the rear surface cover 621 may be configured integrally with the housing 610. In an embodiment, at least a portion of the side surface 610*c* may be disposed to be exposed to the outside through the housing 610.

According to various embodiments, the side surface member 640 may include a first side surface 641 having a first length, a second side surface 642 extending from the first side surface 641 in a direction perpendicular to the first side surface 641 and having a second length larger than the first length, a third side surface 643 extending from the second side surface 642 in parallel to the first side surface 641 and having the first length, and a fourth side surface 644 extending from the third side surface 643 in parallel to the second side surface 642 and having the second length. In an embodiment, the slide structure 660 supports the flexible display 630, and may be slid out from the second side surface 642 toward the fourth side surface 644 (e.g., in the X-axis direction) to increase the display area of the flexible display 630, or may be slid in from the fourth side surface 644 toward the second side surface 642 (e.g., in the −X-axis direction) to decrease the display area of the flexible display 630. In an embodiment, the electronic device 600 may include a first side surface cover 640*a* and a second side surface cover 640*b* to cover the first side surface 641 and the third side surface 643. In an embodiment, the first side surface 641 and the third side surface 643 may be disposed not to be exposed to the outside through the first side surface cover 640*a* and the second side surface cover 640*b*.

According to various embodiments, the electronic device 600 may include a flexible display 630 disposed to be supported by the slide structure 660. In an embodiment, the flexible display 630 may include a first portion 630*a* (e.g., a flat portion) supported by the slide structure 660, and a second portion 630*b* (e.g., a bending portion or a bendable portion) extending from the first portion 630*a* and at least partially supported by a bendable member. In an embodiment, when the electronic device 600 is in a slid-in state (e.g., the state in which at least a portion of the slide structure 660 is slid into the housing 610), the second portion 630*b* may be at least partially slid into the inner space of the housing 610 not to be exposed to the outside, and when the electronic device 600 is in a slid-out state (e.g., the state in which at least a portion of the slide structure 660 is slid out from the housing 610), the second portion 630*b* may be at least partially exposed to the outside to extend from the first portion 630*a* while being supported by at least a portion of the bendable member. Therefore, the electronic device 600 may include a rollable type electronic device or a slidable type electronic device in which the display area of the flexible display 630 is variable depending on the movement of the slide structure 660 from the housing 610.

According to various embodiments, the slide structure 660 may be movably coupled to be at least partially slid into or slid out from the housing 610. For example, the flexible display 630 may be configured to have a display area corresponding to a first width W1 from the second side surface 642 to the fourth side surface 644 in the slid-in state. In an embodiment, in the state in which the slide structure 660 is slid out, when at least a portion of the bendable member slid into the housing 610 moves to the outside of the electronic device to additionally have a second width W2, the flexible display 630 may be transformed to have a display area corresponding to a third width W3 larger than the first width W1. Accordingly, the display area of the flexible display 630 may be variable depending on the width of the electronic device that is variable in response to the sliding operation of the slide structure 660.

According to various embodiments, the electronic device 600 may include at least one of an input module 603, sound output modules 606 and 607, sensor modules 604 and 617, camera modules 605 and 616, a connector port 608, a key input module (not illustrated), or an indicator (not illustrated). As another embodiment, in the electronic device 600, at least one of the above-mentioned components may be omitted, or other components may be additionally included.

In various embodiments, the input module 603 may include a microphone. In some embodiments, the input module 603 may include a plurality of microphones arranged to detect the direction of sound. The sound output modules 606 and 607 may include speakers. The sound output modules 606 and 607 may include an external speaker 606 and a call receiver 607. As another embodiment, the sound output modules 606 and 607 may include a speaker that is operated without a separate speaker hole (e.g., a piezo speaker).

According to various embodiments, the sensor modules 604 and 617 may generate electrical signals or data values corresponding to an internal operating state or an external environmental state of the electronic device 600. The sensor modules 604 and 617 may include, for example, a first sensor module 604 (e.g., a proximity sensor or an illuminance sensor) disposed on the front surface 610*a* of the electronic device 600 and/or a second sensor module 617 (e.g., a heart rate monitor (HRM) sensor) disposed on the rear surface 610*b*. In an embodiment, the first sensor module 604 may be disposed under the flexible display 630 in the front surface 610*a* of the electronic device 600. In an embodiment, the first sensor module 604 may further include at least one of a proximity sensor, an illuminance sensor, a time-of-flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

According to various embodiments, the camera modules 605 and 616 may include a first camera module 605 disposed on the front surface 610*a* of the electronic device 600 and a second camera module 616 disposed on the rear surface 610*b*. In an embodiment, the electronic device 600 may include a flash 618 located near the second camera module 616. In an embodiment, the camera modules 605 and 616 may include one or more lenses, an image sensor, and/or an image signal processor. In an embodiment, the first camera module 605 may be disposed under the flexible display 630 and may be configured to photograph a subject through a portion of an active area of the flexible display 630. In an embodiment, the flash 618 may include, for example, a light-emitting diode or a xenon lamp. In some embodiments, two or more lenses (e.g., a wide-angle lens and a telephoto lens) and image sensors may be disposed on one surface of the electronic device 600.

According to various embodiments, the electronic device 600 may include an antenna structure 500 arranged in the inner space of the housing 610 to form wireless signals toward the rear surface 610*b* (e.g., in the −z-axis direction). In an embodiment, the antenna structure 500 may help determine a distance to an external electronic device or the location of the external electronic device by being replaced with or provided in addition to at least one of the antenna structure 500 in FIG. 5A, the antenna structure 500-1 in FIG. 13, and the antenna structures 500-2, 500-3, 500-4, 500-5, and 500-6 in FIGS. 14A,14B, and 15A to 15C.

Figure 17A:
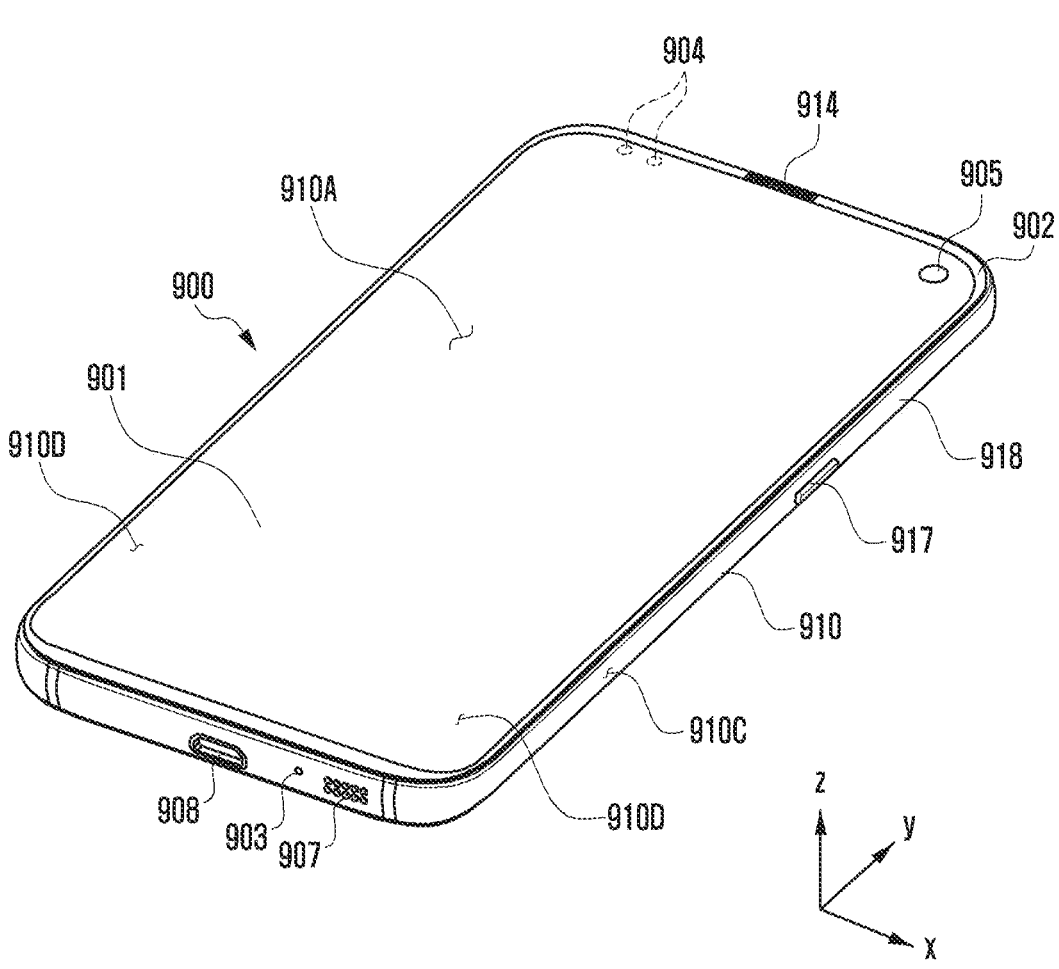
FIG. 17A is a front perspective view of an electronic device according to an embodiment of the disclosure.
Figure 17B:
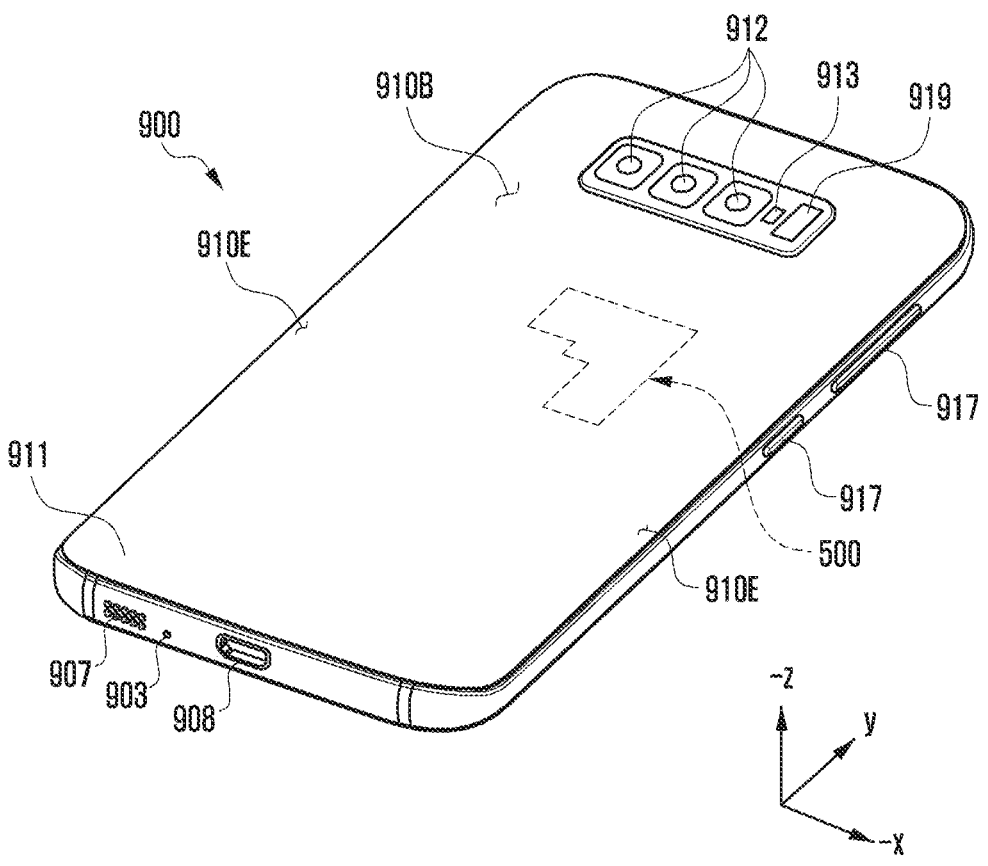
FIG. 17B is a rear perspective view of the electronic device according to an embodiment of the disclosure.

FIG. 17A is a front perspective view illustrating an electronic device according to an embodiment of the disclosure. FIG. 17B is a rear perspective view of the electronic device according to an embodiment of the disclosure.

Referring to FIGS. 17A and 17B, an electronic device 900 may include a housing 910 having a first surface (or a front surface) 910A, a second surface (or a rear surface) 910B, and a side surface 910C surrounding the space between the first surface 910A and the second surface 910B. In another embodiment (not illustrated), the housing 910 may refer to a structure that provides some of the first surface 910A, the second surface 910B, and the side surface 910C in FIG. 17A. In an embodiment, at least a portion of the first surface 910A may be defined by a substantially transparent front surface plate 902 (e.g., a glass plate or a polymer plate including various coating layers). The second surface 910B may be defined by a substantially opaque rear surface plate 911. The rear surface plate 911 may be made of, for example, coated or colored glass, ceramic, polymer, metal (e.g., aluminum, stainless steel (STS), or magnesium), or a combination of two or more of these materials. The side surface 910C may be defined by a side surface bezel structure (or a "side surface member") 918 coupled to the front surface plate 902 and the rear surface plate 911 and including metal and/or polymer. In some embodiments, the rear surface plate 911 and the side surface bezel structure 918 may be integrally configured and may include the same material (e.g., a metal material such as aluminum).

In the illustrated embodiment, the front surface plate 902 may include, at the opposite ends of long edges thereof, first areas 910D, which are bent from the first surface 910A toward the rear surface plate and extend seamlessly. In the illustrated embodiment (see FIG. 17B), the rear surface plate 911 may include, at the opposite ends of long edges thereof, second areas 910E, which are bent from the second surface 910B toward the front surface plate 902 and extend seamlessly. In some embodiments, the front surface plate 902 or the rear surface plate 911 may include only one of the first areas 910D or the second areas 910E. In some embodiments, the front surface plate 902 may not include the first areas and the second areas, and may include only a flat surface arranged parallel to the second surface 910B. In the above-described embodiments, when viewed from a side of the electronic device 900, the side surface bezel structure 918 may have a first thickness (or width) on the side surfaces where the first areas 910D or the second areas 910E are not included, and may have a second thickness smaller than the first thickness, on the side surfaces where the first areas 910D or the second areas 910E are included.

According to an embodiment, the electronic device 900 may include at least one of a display 901 (e.g., a first display), an input device 903, sound output devices 907 and 914, sensor modules 904 and 919, camera modules 905, 912, and 913, a key input device 917, an indicator (not illustrated), and at least one connector 908. In some embodiments, in the electronic device 900, at least one of the components (e.g., the key input device 917 or the indicator) may be omitted, or other components may be additionally included.

The display 901 may be exposed through a substantial portion of, for example, the front surface plate 902. In some embodiments, at least a portion of the display 901 may be exposed through the front surface plate 902, which defines the first surface 910A and the first areas 910D of the side surface 910C. For example, the display 901 may be coupled to or disposed adjacent to a touch-sensitive circuit, a pressure sensor capable of measuring touch intensity (pressure), and/or a digitizer configured to detect a magnetic field-type stylus pen. In some embodiments, at least some of the sensor modules 904 and 919 and/or at least some of the key input devices 917 may be disposed in the first areas 910D and/or the second areas 910E.

According to an embodiment, the input devices 903 may include a microphone. In some embodiments, the input device 903 may include a plurality of microphones arranged to detect the direction of sound. The sound output devices 907 and 914 may include speakers. The sound output devices 907 and 914 may include an external speaker 907 and a call receiver 914. In some embodiments, the input device 903, the sound output devices 907 and 914, and the at least one connector 908 may be disposed in the space in the electronic device 900, and may be exposed to the external environment through one or more holes provided in the housing 910. In some embodiments, the holes provided in the housing 910 may be commonly used for the input device 903 and the sound output devices 907 and 914. In some embodiments, the sound output devices 907 and 914 may include a speaker that operates without a hole in the housing 910 (e.g., a piezo speaker).

According to an embodiment, the sensor modules 904 and 919 may generate electrical signals or data values corresponding to an internal operating state or an external environmental state of the electronic device 900. The sensor modules 904 and 919 may include, for example, a first sensor module 904 (e.g., a proximity sensor) and/or a second sensor module (not illustrated) (e.g., a fingerprint sensor) disposed on the first surface 910A of the housing 910, and/or a third sensor module 919 (e.g., an HRM sensor) disposed on the second surface 910B of the housing 910. The fingerprint sensor may be disposed on the first surface 910A of the housing 910. The fingerprint sensor (e.g., an ultrasonic fingerprint sensor or an optical fingerprint sensor) may be disposed under the display 901 of the first surface 910A. The electronic device 900 may further include at least one of sensor modules (not illustrated), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

According to an embodiment, the camera modules 905, 912, and 913 may include a first camera module 905 disposed on the first surface 910A of the electronic device 900, and/or a second camera module 912 and/or a flash 913 disposed on the second surface 910B. The camera modules 905 and 912 may include one or more lenses, an image sensor, and/or an image signal processor. The flash 913 may include, for example, a light-emitting diode or a xenon lamp. In some embodiments, two or more lenses (e.g., a wide-angle lens and a telephoto lens) and image sensors may be disposed on one surface of the electronic device 900.

According to an embodiment, the key input devices 917 may be disposed on the side surface 910C of the housing 910. In another embodiment, the electronic device 900 may not include some or all of the above-mentioned key input devices 917, and a key input device 917, which is not included, may be implemented in another form, such as a soft key, on the display 901. In another embodiment, the key input devices 917 may be implemented by using pressure sensors included in the display 901.

The indicator may be arranged, for example, on the first surface 910A of the housing 910. The indicator may provide, for example, the state information of the electronic device 900 in an optical form. In another embodiment, the light-emitting element may provide, for example, a light source that is operated in conjunction with the operation of the camera module 905. The indicator may include, for example, a light-emitting diode (LED), an IR LED, and/or a xenon lamp.

According to an embodiment, the at least one connector 908 may include a first connector hole capable of accom-modating at least one of a connector (e.g., a USB connector or an interface connector port (IF) module) configured to transmit/receive power and/or data to/from an external elec-tronic device, or a second connector hole (or an earphone jack) capable of accommodating a connector configured to transmit/receive an audio signal to/from an external elec-tronic device.

According to an embodiment, a camera module 905 from among the camera modules 905 and 912, a sensor module 904 from among the sensor modules 904 and 919, or an indicator may be disposed to be exposed through the display 901. For example, the camera module 905, the sensor module 904, or the indicator may be arranged in the inner space in the electronic device 900 to be in contact with the external environment through an opening perforated in the display 901 up to the front surface plate 902. As another embodiment, some sensor modules 904 may be disposed in the inner space in the electronic device to perform the functions thereof without being visually exposed through the front surface plate 902. For example, in this case, the perforated opening of the area facing the sensor module of the display 901 may not be necessary.

According to various embodiments, the electronic device 900 may include an antenna structure 500 arranged in the inner space of the housing 910 to form wireless signals in the direction in which the rear surface plate 911 is oriented (e.g., the −z-axis direction). In an embodiment, the antenna struc-ture 500 may help determine a distance to an external electronic device or the location of the external electronic device by being replaced with or provided in addition to at least one of the antenna structure 500 in FIG. 5A, the antenna structure 500-1 in FIG. 13, and the antenna struc-tures 500-2, 500-3, 500-4, 500-5, and 500-6 in FIGS. 14A, 14B, and 15A to 15C.

An antenna structure (e.g., the antenna structure 500 in FIG. 5A) according to various embodiments of the disclo-sure may be applied to a tablet PC, a laptop PC, or other electronic devices having wireless communication func-tions.

According to various embodiments, an electronic device (e.g., the electronic device 200 in FIG. 4) may include a housing (e.g., the first housing 210 in FIG. 4), an antenna structure (e.g., the antenna structure 500 in FIG. 4) disposed in the housing, wherein the antenna structure includes a substrate (e.g., the dielectric substrate 590 in FIG. 5A) including a first substrate surface (e.g., the first substrate surface 5901 in FIG. 5A), a second substrate surface (e.g., the second substrate surface 5902 in FIG. 5A) facing away from the first substrate surface, and a ground layer (e.g., the ground layer G in FIG. 5A) disposed between the first substrate surface and the second substrate surface, a first conductive patch including a plurality of sub-patches (e.g., the sub-patches 510, 520, and 530 in FIG. 5A) arranged to correspond to the ground layer, and a second conductive patch (e.g., the second conductive patch 540 in FIG. 5A) disposed between a first sub-patch (e.g., the first sub-patch 510 in FIG. 5A) and a second sub-patch (e.g., the second sub-patch 520 in FIG. 5A) among the plurality of sub-patches of the first conductive patch when viewed from above the first substrate surface, and a wireless communi-cation circuit 192a (e.g., the wireless communication mod-ule 192 in FIG. 1) configured to transmit or receive a first wireless signal in a first frequency band through the plurality of sub-patches of the first conductive patches and to transmit or receive a second wireless signal in a second frequency band through the second conductive patch. The electronic device may further include a first non-conductive area (e.g., the non-conductive area 561 in FIG. 5A) disposed in a position overlapping at least a portion of the second con-ductive patch when viewed from above the first substrate surface.

According to various embodiments, the first non-conduc-tive area may be provided through omission of a portion of the ground layer.

According to various embodiments, the first non-conduc-tive area may have a first length (e.g., the first length L1 in FIG. 5A) along an edge of the substrate and a second length (e.g., the second length L2 in FIG. 5A) in a direction perpendicular to the first length.

According to various embodiments, the second length may be greater than λ/4 based on the first frequency band.

According to various embodiments, the second frequency band may be determined by the second length of the first non-conductive area.

According to various embodiments, the second frequency band may be determined by the first length of the first non-conductive area.

According to various embodiments, the first conductive patch may include a circular polarization antenna.

According to various embodiments, the second conduc-tive patch may include at least one slot (e.g., the slots 542 and 543 in FIG. 5D), and the second frequency band may be determined based on the shape of the at least one slot.

According to various embodiments, the housing (e.g., the housing 910 in FIG. 17A) may include a front surface cover (e.g., the front surface cover 902 in FIG. 17A), a rear surface cover (e.g., the rear surface plate 911 in FIG. 17B) facing away from the front surface cover, and a side surface member (e.g., the side surface member 918 in FIG. 17A) surrounding a space between the front surface cover and the rear surface cover and at least partially exposed outside of the electronic device. The antenna structure may be disposed such that the first substrate surface faces the rear surface cover.

According to various embodiments, at least a portion of the side surface member (e.g., the first side surface member 213 in FIG. 2B) may include a conductive portion (e.g., the conductive portion 410 in FIG. 2B), and the wireless com-munication circuit may be configured to transmit or receive at least one of the first wireless signal in the first frequency band or the second wireless signal in the second frequency band via the conductive portion.

According to various embodiments, the second conduc-tive patch and the conductive portion may be configured to operate as a diversity antenna in the second frequency band via the wireless communication circuit.

According to various embodiments, the first conductive patch and the conductive portion may be configured to operate as a diversity antenna in the first frequency band via the wireless communication circuit.

According to various embodiments, the first sub-patch and the second sub-patch may be arranged side by side along a first direction (e.g., direction (I in FIG. 5A), and the first conductive patch may further include a third sub-patch 530 disposed to be spaced apart from the first sub-patch in a second direction (e.g., direction ② in FIG. 5A) perpendicular to the first direction.

According to various embodiments, the antenna structure may further include a third conductive patch (e.g., the third conductive patch 550 in FIG. 14B) disposed between the first sub-patch and the third sub-patch, and the wireless communication circuit may be configured to transmit or receive the second wireless signal in the second frequency band via the third conductive patch.

According to various embodiments, the electronic device may further include a second non-conductive area (e.g., the second non-conductive area 562 in FIG. 14B) disposed in a position overlapping the third conductive patch when viewed from above the first substrate surface.

According to various embodiments, the second conductive patch and the third conductive patch may be configured to operate as a diversity antenna in the second frequency band via the wireless communication circuit.

According to various embodiments, the first frequency band may include a frequency band in the range of 7.75 GHz to 8.25 GHz.

According to various embodiments, the second frequency band may include a frequency band in the range of 6.25 GHz to 6.75 GHz.

According to various embodiments, the wireless communication circuit may be electrically connected to a feeder (e.g., the feeder F1 in FIG. 13) located in at least a portion of the ground layer across the non-conductive area.

According to various embodiments, the wireless communication circuit may be configured to transmit or receive a wireless signal in a third frequency band different from the first frequency band and/or the second frequency band through the feeder.

The embodiments of the disclosure described and shown in the specification and the drawings are merely specific examples that have been presented to easily explain the technical contents of embodiments of the disclosure and help understanding of embodiments of the disclosure, and are not intended to limit the scope of embodiments of the disclosure. Therefore, the scope of various embodiments of the disclosure should be construed to include, in addition to the embodiments set forth herein, all changes and modifications derived based on the technical idea of various embodiments of the disclosure.

What is claimed is:

1. An electronic device comprising:
   a housing;
   an antenna structure disposed in the housing, the antenna structure comprising;
   a substrate including a first substrate surface, a second substrate surface facing away from the first substrate surface, and a ground layer disposed between the first substrate surface and the second substrate surface,
   a first conductive patch including a plurality of sub-patches arranged to correspond to the ground layer, and a second conductive patch disposed between a first sub-patch and a second sub-patch among the plurality of sub-patches of the first conductive patch when viewed from above the first substrate surface; and a wireless communication circuit configured to transmit or receive a first wireless signal in a first frequency band through the plurality of sub-patches of the first conductive patch and to transmit or receive a second wireless signal in a second frequency band through the second conductive patch, wherein the electronic device comprises a first non-conductive area disposed in a position overlapping at least a portion of the second conductive patch when viewed from above the first substrate surface.

2. The electronic device of claim 1, wherein the first non-conductive area is provided through omission of a portion of the ground layer.

3. The electronic device of claim 1, wherein the first non-conductive area has a first length along an edge of the substrate and a second length in a direction perpendicular to the first length.

4. The electronic device of claim 3, wherein the second length is greater than $\lambda/4$ based on the first frequency band.

5. The electronic device of claim 3, wherein the second frequency band is determined by the second length of the first non-conductive area.

6. The electronic device of one of claim 3, wherein the second frequency band is determined by the first length of the first non-conductive area.

7. The electronic device of claim 1, wherein the first conductive patch includes a circular polarization antenna.

8. The electronic device of claim 1,
   wherein the second conductive patch comprises at least one slot, and
   wherein the second frequency band is determined based on a shape of the at least one slot.

9. The electronic device of claim 1,
   wherein the housing comprises:
   a front surface cover,
   a rear surface cover facing away from the front surface cover, and
   a side surface member surrounding a space between the front surface cover and the rear surface cover and at least partially exposed outside of the electronic device, and
   wherein the antenna structure is disposed such that the first substrate surface faces the rear surface cover.

10. The electronic device of claim 9,
   wherein at least a portion of the side surface member comprises a conductive portion, and
   wherein the wireless communication circuit is configured to transmit or receive at least one of the first wireless signal in the first frequency band or the second wireless signal in the second frequency band via the conductive portion.

11. The electronic device of claim 10, wherein the second conductive patch and the conductive portion are configured to operate as a diversity antenna in the second frequency band via the wireless communication circuit.

12. The electronic device of claim 10, wherein the first conductive patch and the conductive portion are configured to operate as a diversity antenna in the first frequency band via the wireless communication circuit.

13. The electronic device of claim 1,
   wherein the first sub-patch and the second sub-patch are arranged side by side along a first direction, and wherein the first conductive patch further includes a third sub-patch disposed to be spaced apart from the first sub-patch in a second direction perpendicular to the first direction.

14. The electronic device of claim 13, wherein the antenna structure includes a third conductive patch disposed between the first sub-patch and the third sub-patch, and wherein the wireless communication circuit is configured to transmit or receive the second wireless signal in the second frequency band via the third conductive patch.

15. The electronic device of claim 14, further comprising:

a second non-conductive area disposed in a position overlapping the third conductive patch when viewed from above the first substrate surface.

16. The electronic device of claim 1, wherein at least another portion of the second conductive patch is in a position overlapping the ground layer when viewed from above the first substrate surface.

17. The electronic device of claim 16, wherein at least one dielectric layer of the substrate is disposed between the ground layer and the plurality of sub-patches of the first conductive patch, and wherein the at least one dielectric layer of the substrate is disposed between the ground layer and the at least the another portion of the second conductive patch overlapping the ground layer when viewed from above the first substrate surface.

18. The electronic device of claim 1, wherein the substrate includes a plurality of dielectric layers, and wherein the plurality of sub-patches of the first conductive patch are disposed on a different dielectric layer of the plurality of dielectric layers than the second conductive patch is disposed on.

19. The electronic device of claim 1, wherein the plurality of sub-patches of the first conductive patch and the second conductive patch are disposed between the first substrate surface and the second substrate surface.

20. The electronic device of claim 1, wherein the second conductive patch operates as a monopole antenna via the first non-conductive area.

* * * * *